US 8,172,714 B2

(12) United States Patent
Ishimori et al.

(10) Patent No.: US 8,172,714 B2
(45) Date of Patent: May 8, 2012

(54) SPEED CHANGING TRANSMISSION APPARATUS

(75) Inventors: Shoso Ishimori, Sakai (JP); Yoshiyuki Katayama, Osaka (JP); Yoshihiro Ueda, Sakai (JP); Shinichi Morita, Sakai (JP); Shinichi Kawabata, Sakai (JP); Shigeki Hayashi, Sakai (JP); Masaaki Nishinaka, Izumi (JP); Takayasu Kobayashi, Osaka (JP); Go Takagi, Sakai (JP)

(73) Assignee: Kubota Corporation, Osaka (JP)

( * ) Notice: Subject to any disclaimer, the term of this patent is extended or adjusted under 35 U.S.C. 154(b) by 686 days.

(21) Appl. No.: 12/281,719

(22) PCT Filed: Sep. 25, 2007

(86) PCT No.: PCT/JP2007/068534
§ 371 (c)(1),
(2), (4) Date: Jan. 7, 2009

(87) PCT Pub. No.: WO2008/108017
PCT Pub. Date: Sep. 12, 2008

(65) Prior Publication Data
US 2009/0156345 A1  Jun. 18, 2009

(30) Foreign Application Priority Data

Mar. 5, 2007  (JP) ................. 2007-054188
Aug. 27, 2007  (JP) ................. 2007-219904
Aug. 27, 2007  (JP) ................. 2007-219905

(51) Int. Cl.
*F16H 3/72* (2006.01)
*F16H 37/06* (2006.01)
*F16H 47/04* (2006.01)
*F16H 3/44* (2006.01)
*B60K 17/06* (2006.01)

(52) U.S. Cl. ............. 475/275; 475/72; 475/5; 475/296
(58) Field of Classification Search ............ 475/72, 475/73, 3–5, 296, 329, 330; 180/364, 369
See application file for complete search history.

(56) References Cited

U.S. PATENT DOCUMENTS
5,159,855 A * 11/1992 Nikolaus et al. ............... 475/78
(Continued)

FOREIGN PATENT DOCUMENTS
EP        1 930 198        6/2008
(Continued)

*Primary Examiner* — Tisha Lewis
(74) *Attorney, Agent, or Firm* — The Webb Law Firm

(57) ABSTRACT

A composite planetary transmission section (P) is provided for synthesizing output from a stepless speed changing section (20) with an engine drive force. In a transmission line from the planetary transmission section (P) to an output rotational body (90), there are provided first clutch mechanism (60), a second clutch mechanism (70), a speed-reducing planetary transmission mechanism (80), an operable coupling clutch mechanism (110) and an output clutch mechanism (120). A ring gear (83) of the speed-reducing planetary transmission mechanism (80) includes a brake mechanism (100). A sun gear (43) of the planetary transmission section (P), an input side rotational member (62) of the first clutch mechanism (60), an input side rotational member (71) of the second clutch mechanism (70), a sun gear (84) of the speed-reducing planetary transmission mechanism (80), and an input side rotational member (122) of the output clutch mechanism (120) are rotatable about a common rotational axis. A rotational shaft (97) operably coupling a carrier (44) of the composite planetary transmission section (P) with the output rotational body (90) is inserted through a planetary transmission mechanism (50) of the composite planetary transmission section (P), the first clutch mechanism (60), the second clutch mechanism (70) and the speed-reducing planetary transmission mechanism (80).

7 Claims, 15 Drawing Sheets

U.S. PATENT DOCUMENTS

| | | | | |
|---|---|---|---|---|
| 5,466,197 A | * | 11/1995 | Mitsuya et al. | 475/72 |
| 6,042,496 A | * | 3/2000 | Lehle et al. | 475/81 |
| 7,887,449 B2 | * | 2/2011 | Katayama et al. | 475/82 |
| 2008/0214351 A1 | | 9/2008 | Katayama et al. | |
| 2009/0149292 A1 | | 6/2009 | Hiraoka et al. | |
| 2009/0270212 A1 | * | 10/2009 | Ueda et al. | 475/74 |
| 2009/0280944 A1 | * | 11/2009 | Hiraoka et al. | 475/116 |

FOREIGN PATENT DOCUMENTS

| | | |
|---|---|---|
| JP | 2509997 B | 8/1990 |
| JP | 2911128 B | 11/1990 |
| JP | 4203652 | 7/1992 |
| JP | 05-187526 | 7/1993 |
| JP | 6045733 Y2 | 11/1994 |
| JP | 11291777 A | 10/1999 |
| JP | 3176677 B2 | 4/2001 |
| JP | 2001108060 | 4/2001 |
| JP | 2004069028 | 3/2004 |
| JP | 2007-091139 | 4/2007 |
| JP | 2007091139 A | 4/2007 |
| JP | 2007092949 | 4/2007 |
| WO | WO 92/09830 | 6/1992 |

* cited by examiner

Fig.5
|  | first clutch mechanism 60 | second clutch mechanism 70 | brake mechanism 100 | operable coupling clutch mechanism 110 | output clutch mechanism 120 |
|---|---|---|---|---|---|
| first speed range | ENGAGED | — | ENGAGED | — | — |
| second speed range | — | ENGAGED | ENGAGED | — | — |
| third speed range | — | — | — | ENGAGED | ENGAGED |
| fourth speed range | — | ENGAGED | — | ENGAGED | — |
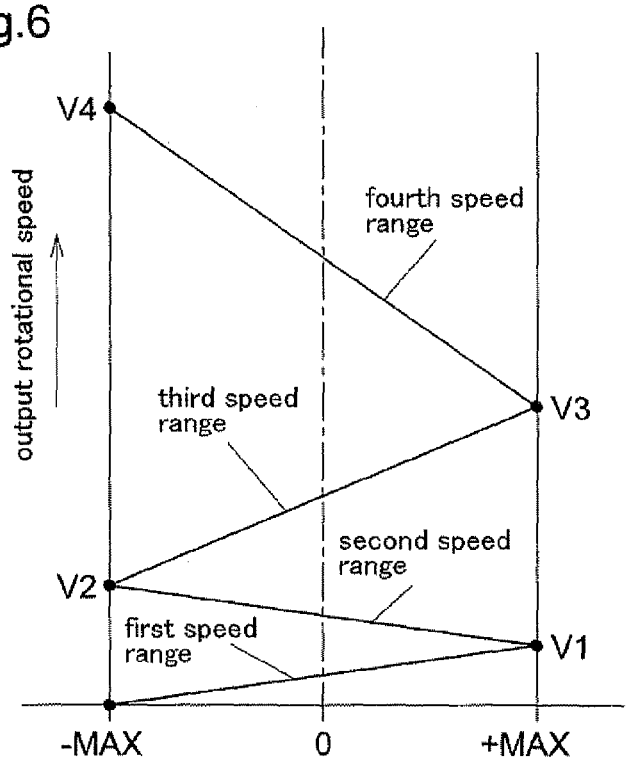
Fig.6
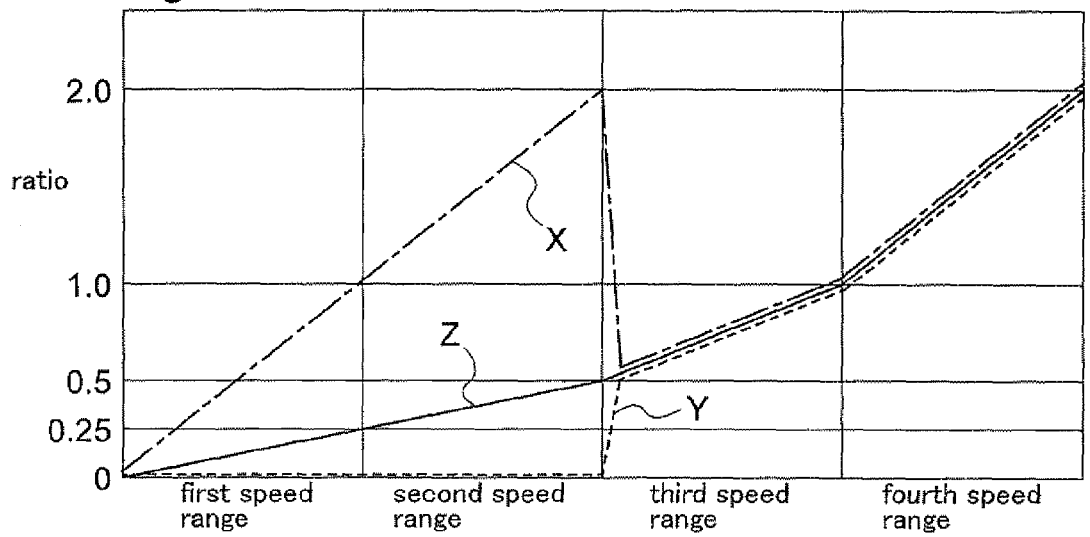
Fig.7

|  | first clutch C11 | second clutch C12 | third clutch C13 | fourth clutch C14 | brake B |
|---|---|---|---|---|---|
| first speed range | ENGAGED | — | — | — | ENGAGED |
| second speed range | — | ENGAGED | — | — | ENGAGED |
| third speed range | — | ENGAGED | ENGAGED | — | — |
| fourth speed range | — | ENGAGED | — | ENGAGED | — |

SPEED CHANGING TRANSMISSION APPARATUS

TECHNICAL FIELD

The present invention relates to a speed changing transmission apparatus, more particularly to a speed changing transmission apparatus having a composite planetary transmission section for synthesizing an output from a stepless speed changing section and an engine drive force not subjected to any speed changing action by the stepless speed changing section, or synthesizing an output from an electrically driven motor with an engine drive force.

BACKGROUND ART

As an example of the speed changing transmission apparatus of the above-noted type, there was developed one disclosed in Patent Document 1. In the following, the construction disclosed in Patent Document 1 will be described. However, the purpose of this description is to explain the present application through comparison between the construction disclosed in this published gazette and the construction of the present application, the description should not be taken necessarily as admission of the construction disclosed in Patent Document 1 as prior art.

FIG. 17 is a diagram of a transmission apparatus of a tractor including a speed changing transmission apparatus S previously developed. As shown in this figure, this previously developed speed changing transmission apparatus S includes a stepless speed changing device 20A acting as a stepless speed changing section, and includes also a planetary transmission section P1, a clutch section C1, a third planetary transmission mechanism U3, and a brake B for acting on the third planetary transmission mechanism U. Numeral 10 shown in FIG. 17 represents a forward/reverse switchover device, numeral 3 denotes a rear wheel differential mechanism, and numeral 7 denotes a front wheel differential mechanism.

The stepless speed changing device 20A includes a variable displacement type hydraulic pump 23 having its pump shaft operably coupled via a main clutch 2 with an output shaft 1a of an engine 1, and a hydraulic motor 24 driven by pressure oil from this hydraulic pump 23.

The planetary transmission section P1 includes a first planetary transmission mechanism U1 and a second planetary transmission mechanism U2. Planet gears of the first planetary transmission mechanism U1 and planet gears of the second planetary transmission mechanism U2 are operably coupled with each other through meshing of coupling gear portions provided in the respective planet gears. The planet gears of the first planetary transmission mechanism U1 and planet gears of the second planetary transmission mechanism U2 are supported to a carrier 44 commonly used by the first planetary transmission mechanism U1 and the second planetary transmission mechanism U2.

The clutch section C1 includes a first clutch C11, a second clutch C12, a third clutch C13 and a fourth clutch C14. An input side rotational member (a) of the first clutch C11 is operably coupled via an operable coupling mechanism K1 to a ring gear of the second planetary transmission mechanism U2. An input side rotational member (b) of the second clutch C12 is operably coupled via a rotational shaft (c) to a sun gear of the second planetary transmission mechanism U2. An input side rotational member (d) of the third clutch C13 is operably coupled via an operable coupling mechanism K2 to the carrier 44 of the planetary transmission section P1.

The operable coupling mechanism K1, which operably couples the input side rotational member (a) of the first clutch C11 with the ring gear of the second planetary transmission mechanism U2, includes a clutch side transmission gear G1 meshed with the input side rotational member (a) of the first clutch C11, a planetary side transmission gear G2 meshed with the ring gear of the second planetary transmission mechanism U2, and a rotational shaft S1 coupled to the clutch side transmission gear G1 and the planetary side transmission gear G2. The operable coupling mechanism K2, which operably couples the input side rotational member (d) of the third clutch C13 with the carrier 44 of the planetary transmission section P, includes a clutch side transmission gear G3 meshed with the input side rotational member (d) of the third clutch C13, a planetary side transmission gear G4 meshed with the carrier 44, and a rotational shaft S2 coupled to the clutch side transmission gear G3 and the planetary side transmission gear G4.

The sun gear of the third planetary transmission mechanism U3 is operably coupled to an output side rotational member (e) of the first clutch C11 and the second clutch C12 and to an input side rotational member (f) of the third clutch C13. The carrier of the third planetary transmission mechanism U3 is operably coupled to an output side rotational member (g) of the third clutch C13 and the fourth clutch C14. The brake B can be switched over into an engaged state for applying a braking action on the ring gear of the third planetary transmission mechanism U3 and a disengaged state for releasing the braking action on the ring gear.

FIG. 19 is an explanatory view for explaining relationship between operational conditions of the respective clutches C11, C12, C13, C14 and the brake B of the previously developed speed changing transmission apparatus S and speed ranges of this speed changing transmission apparatus S. The mark "ENGAGED" in FIG. 19 represents engaged states of the respective clutches C11, C12, C13, C14 and the brake B. The mark "-" in FIG. 19 represents disengaged states of the respective clutches C11, C12, C13, C14 and the brake B.

FIG. 18 is an explanatory view for explaining relationship among speed changing conditions of the stepless speed changing device 20A of the previously developed speed changing transmission apparatus S, the speed ranges of the speed changing transmission apparatus S, and output speeds provided by a carrier shaft US (corresponding to "an output rotational body") of the third planetary transmission mechanism U3. The vertical axis in FIG. 18 represents the output speed of the carrier shaft US. The horizontal axis in FIG. 18 represents speed changing conditions of the stepless speed changing device 20A. The sign "−MAX" in FIG. 18 denotes the speed changing condition of the maximum speed under reverse rotation transmitting condition of the stepless speed changing device 20A. The sign "0" on the horizontal axis represents the neutral condition of the stepless speed changing device 20A. The sign "+MAX" on the horizontal axis represents the speed changing condition of the maximum speed under forward rotation transmitting condition of the stepless speed changing device 20A.

As shown in these figures, with the previously developed speed changing transmission apparatus S, the output from the stepless speed changing device 20A and the drive force of the pump shaft of the stepless speed changing device 20A (the engine drive force not subjected to any speed changing action by the stepless speed changing device) are synthesized by the planetary transmission section P1. As the stepless speed changing device 20A is operated for speed change and as the first through fourth clutches C11, C12, C13, C14 and the brake B are switched over appropriately in association with the this speed changing operation, the synthesized drive force outputted from the planetary transmission section P1 is provided in any one of the first through fourth speed stages and in each speed stage, the force is steplessly speed-changed to be outputted from the carrier shaft US of the third planetary transmission mechanism U3.

Patent Document 1: Japanese Patent Application "Kokai" No. 2007-092949 (JP2007-092949 A).

DISCLOSURE OF THE INVENTION

According to a first invention of the present invention, a speed changing transmission apparatus having an input shaft for inputting drive force from an engine and an output rotational body, wherein the drive force is provided in a plurality of stages of speeds, and in the range of each speed stage, the drive force steplessly speed changed being outputted from the output rotational shaft, said apparatus comprising:

a stepless speed changing section inputting a drive force from an electric motor or an engine;

a composite planetary transmission section having a downstream planetary transmission mechanism, the transmission section synthesizing output from said stepless speed changing section with an engine drive force not subjected to any speed changing action by said stepless speed changing section or synthesizing output from said electric motor with the drive force of the engine;

a clutch section including a first clutch mechanism having an input side rotational member operably coupled to a ring gear included in said downstream planetary transmission mechanism and a second clutch mechanism having an input side rotational member operably coupled to a sun gear included in said downstream planetary transmission mechanism; a speed-reducing planetary transmission mechanism having a sun gear operably coupled to an output side rotational member each one of said first clutch mechanism and said second clutch mechanism and having also a carrier operably coupled to said output side rotational member;

a brake mechanism switchable between an engaged state for applying a braking action to the ring gear of said speed-reducing planetary transmission mechanism and a disengaged state for releasing the braking action to said ring gear;

an operable coupling clutch mechanism switchable between an engaged stage for operably coupling said ring gear and said carrier of said speed-reducing planetary transmission mechanism for rotating these together in unison and a disengaged state for disengaging the operable coupling between said ring gear and said carrier; and an output clutch mechanism for engaging/disengaging a drive force from said carrier of said planetary transmission section to said output rotational body;

wherein said sun gear of the planetary transmission section, said input side rotational member of the first clutch mechanism, said input side rotational member of the second clutch mechanism, said sun gear of the speed-reducing planetary transmission mechanism, and said input side rotational member of the output clutch mechanism are arranged to be rotatable about a common rotational axis; and wherein a rotational shaft for operably coupling said carrier of the planetary transmission section to said output rotational body is arranged to be inserted through said downstream planetary transmission mechanism, said first clutch mechanism, said second clutch mechanism, and said speed-reducing planetary transmission mechanism.

According to the construction of the first invention, the sun gear of the planetary transmission section, the input side rotational member of the first clutch mechanism, the input side rotational member of the second clutch mechanism, the sun gear of the speed-reducing planetary transmission mechanism, and the input side rotational member of the output clutch mechanism are arranged to be rotatable about a common rotational axis. Also, a rotational shaft for operably coupling the carrier of the planetary transmission section to the output rotational body is arranged to be inserted through the downstream planetary transmission mechanism, the first clutch mechanism, the second clutch mechanism, and the speed-reducing planetary transmission mechanism. As a result, it is possible to transmit the output from the composite planetary transmission section to the output rotational body, with eliminating such structural elements which project to the outer peripheral side, from the composite planetary transmission section, the clutch section, the speed-reducing planetary transmission mechanism, and the output clutch mechanism, or restricting the projection amounts thereof if any even when they project.

With the above, it is possible to obtain a drive force which is synthesized as being outputted from the engine and the electric motor or from the engine and the stepless speed changing section, the force being provided in a plurality of states of speed range, and being steplessly speed-changed in each speed stage. Moreover, there is provided an option of eliminating or minimizing the projection amount of any structure member projecting to the outer peripheral side of the composite planetary transmission section, the clutch section, the speed-reducing planetary transmission mechanism and the output clutch mechanism. Therefore, if desired, it is possible to form the speed changing transmission apparatus compact.

According to a second invention, said speed changing transmission apparatus includes a first speed range, a second speed range, a third speed range and a fourth speed range; and when said output rotational body is driven in said third speed range, said operable coupling clutch mechanism is operated into the engaged state.

With the second invention, there hardly occurs a speed changing shock from the speed reducing planetary transmission mechanism in the course of an range transcending speed change operation comprising switching over from one to the other of the third speed range and the fourth speed range. That is to say, when the output rotational body is driven in the third speed range, this output rotational body and the transmission-wise downstream sun gear of the planetary transmission section are operably coupled with each other via the output clutch mechanism, with the speed-reducing planetary transmission mechanism being not operable for transmission. With this, even when the operable coupling clutch mechanism is operated into the disengaged state in the third speed range, in the range transcending speed changing operation between the second speed range and the third speed range or between the third speed range and the fourth speed range, the speed changing driving operation of the output rotational body is effected under continuously speed changing condition.

In the range transcending speed change from the third speed range to the fourth speed range, the speed-reducing planetary transmission mechanism is operably coupled with the output shaft which is rotated at a higher rotational speed than the case of range transcending speed change between the second speed range and the third speed range, so the speed-reducing planetary transmission mechanism is rotated abruptly at a high rotational speed. On the other hand, according to the construction of the second invention, at the time of the range transcending speed change from the third speed range to the fourth speed range, there has already been established coupled rotation between the speed-reducing planetary transmission mechanism and the output shaft, so that no abrupt rotation of the speed-reducing planetary transmission mechanism at a high rotational speed occurs. At the time of the range transcending speed change from the fourth speed range to the third speed range, the operable coupling between the speed-reducing planetary transmission mechanism and the output shaft, is maintained, so that no abrupt stop of the speed-reducing planetary transmission mechanism from the high rotational speed occurs.

With the above, there can be obtained a speed changing transmission apparatus capable of effecting smoothly the range transcending speed change between the third speed range and the fourth speed range, with reduced possibility of speed changing shock from the speed-reducing planetary transmission mechanism.

According to a third invention, said first clutch mechanism, said second clutch mechanism and said output clutch mechanism comprise meshing clutches.

With the construction of the third invention, as the first clutch mechanism, the second clutch mechanism and the output clutch mechanism comprise meshing clutches, the first clutch mechanism, the second clutch mechanism and the output clutch mechanism can be obtained with relative simple constructions.

According to a fourth invention, the first clutch mechanism, the second clutch mechanism and the output clutch mechanism each includes a non-operative clutch pawl provided on one of the input side rotational member and the output side rotational member to be rotatable in unison therewith; and an operative clutch pawl provided on the other of the input side rotational member and the output side rotational member to be slidable thereon, and wherein said operative clutch pawl is slidable into an engaged state engaged with said non-operative clutch pawl to be rotatable in unison therewith or a disengaged state detached from said non-operative clutch pawl.

With the construction of the fourth invention, the first clutch mechanism, the second clutch mechanism and the output clutch mechanism each can be operated between the engaged state and the disengaged stage with a light operating force for only sliding the operative clutch pawl.

Therefore, the switchover operations of the first clutch mechanism, the second clutch mechanism and the output clutch mechanism can be effected in good timing and speedily with the light operational force, so that a high-quality speed changing transmission apparatus having superior speed changing performance can be obtained.

According to a fifth invention, a support shaft which supports at least said downstream planetary transmission mechanism and said speed-reducing planetary transmission mechanism defines an oil feeding passage for feeding lubricant oil to said downstream planetary transmission mechanism and said speed-reducing planetary transmission mechanism;

a hydraulic piston for switching over the clutch mechanism is provided in an input side rotational member or an output side rotational member of each one of said first and second clutch mechanisms; and in correspondence with each one of said first and second clutch mechanisms, there are provided a transmission case portion provided in said transmission case for slidably and rotatably contacting either one of said input side rotational member and output side rotational member including said hydraulic piston, and an operational oil passage provided in said transmission case portion for feeding/discharging operational oil relative to said hydraulic piston.

With the construction of the fifth invention, when the stepless speed changing section or the electric motor is speed changed to a predetermined speed condition in response to a speed changing operation of the stepless speed changing section or the electric motor, feeding or discharging of operational oil relative to the hydraulic piston is effected immediately, so that the hydraulic piston can be operated with good response and also the hydraulic piston acts directly on the clutch mechanism, so that the clutch mechanism is switched over with good response.

Further, with the construction of the fifth invention, as the support shaft defines an oil feeding passage for feeding lubricant oil to the plurality of planetary transmission mechanisms and the speed-reducing planetary transmission mechanism and in the transmission case portion, there is provided an operational oil passage for feeding/discharging operational oil to hydraulic pistons of the plurality of clutch mechanisms, lubricant oil can be fed to each planetary transmission mechanism and the speed-reducing planetary transmission mechanism, while achieving diameter reduction of the support shaft, in comparison with a case of adopting a construction wherein the support shaft defines not only the oil feeding passage, but also the operational oil passage, and also switchover of the clutch mechanism can be effected with good response.

With the above, there can be obtained a speed changing transmission apparatus according to which the switchover of each clutch mechanism in association with a speed change of the stepless speed changing section or the electric motor can be effected without delay in the speed change of the stepless speed changing section or the electric motor, whereby the change in the output can occur smoothly and moreover each planetary transmission mechanism can operate smoothly and quietly, with feeding of lubricant oil thereto.

According to a sixth invention, an operational valve of each one of said first and second clutch mechanisms is supported to one oil passage forming block.

With the construction of the sixth invention, by adopting an assembly method of attaching the oil passage forming block with a plurality of operational valves being supported to this oil passage forming block, the plurality of operational valves can be assembled at one time.

Therefore, the plurality of operational valves can be assembled at a time, only by assembling the oil passage forming block, so that the assembly operation can be carried out in an efficient manner.

According to a seventh invention, said oil passage forming block is disposed on the outer face side of said transmission case. With the construction of the seventh invention, the assembly of the oil passage forming block to the transmission case can be readily effected, outside the transmission case. Therefore, in addition to the possibility of one-time assembly of the plurality of operational valves simultaneously with the assembly of the oil passage forming block, there is achieved further possibility of easy assembly operation of the oil passage forming block, hence, the assembly operation can be effected even more easily.

BEST MODE OF EMBODYING THE INVENTION

Next, embodiments of the present invention will be described with reference to drawings. Although a plurality of embodiments will be described below, it is understood that combinations of features of one embodiment and features of other embodiments are included in the scope of the present invention.

Figure 1:
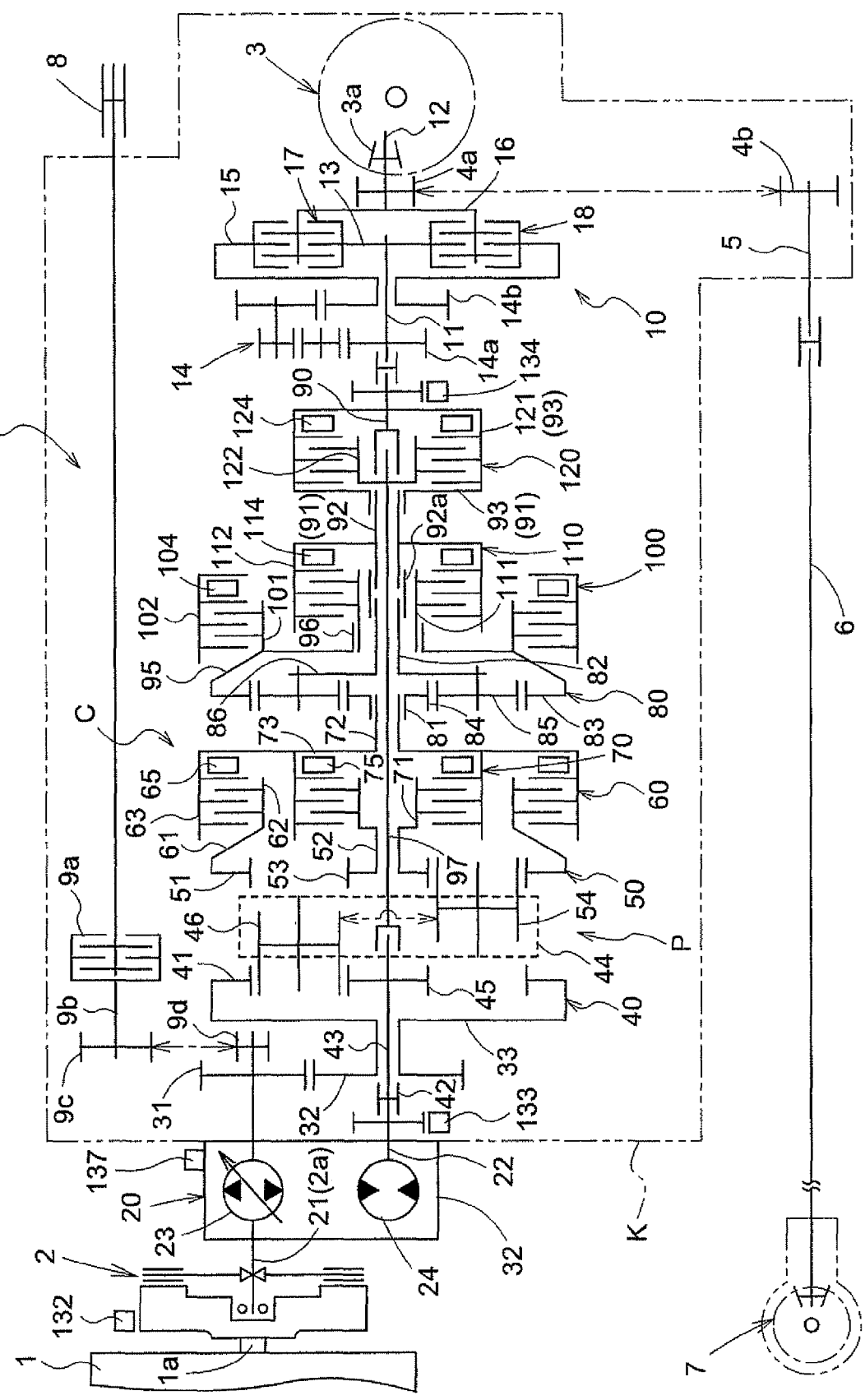
FIG. 1 a diagram of a transmission apparatus of a tractor.

FIG. 1 is a diagram of a traveling transmission apparatus of a tractor mounting a speed changing transmission apparatus A relating to an embodiment of the present invention. As shown in this figure, the traveling transmission apparatus of the tractor includes a main clutch 2 inputting an output from an output shaft 1a of an engine 1, the speed changing transmission apparatus A according to this embodiment, having an input shaft 21 thereof coupled to an output shaft 2a of the main clutch 2 to be rotatable in unison therewith, a forward/reverse switchover device 10 having an input shaft 11 thereof coupled to an output shaft 90 as an output rotational body of the speed changing transmission apparatus A to be rotatable in unison therewith, a rear wheel differential mechanism 3 having an input gear 3a coupled to an output shaft 12 of the forward/reverse switchover device 10, a front wheel transmission shaft 5 coupled, via a gear 4a and a gear 4b, to the output shaft 12 of the forward/reverse switchover device 10, and a front wheel differential mechanism 7 inputting, via a rotational shaft 6, the drive force of the front wheel transmission shaft 5. The output shaft 2a of the main clutch 2 and the input shaft 21 of the speed changing transmission apparatus A are constructed as a same shaft.

A power takeoff (PTO) shaft 8 shown in FIG. 1 is provided for transmitting drive force to various work implements such as a rotary plow connected to the tractor. This PTO shaft 8 is operably coupled to the input shaft 21 via a work clutch 9a, a rotational shaft 9b, a gear 9c and a gear 9d.

As shown in FIG. 1, the speed changing transmission apparatus A relating to the present embodiment includes, in addition to the input shaft 21 and the output shaft 90, a stepless speed changing section 20 having the input shaft 21, a composite planetary transmission section P having a ring gear 41 operably coupled, via a gear 31, a gear 32 and a rotational body 33, to the input shaft 21 of the stepless speed changing section 20 and having also a sun gear shaft 43 operably coupled via a coupling tool 42 to a motor shaft 22 of the stepless speed changing section 20, and a speed changing transmission section Z having an input side rotational member 62 coupled to a ring gears 51 of the planetary transmission section P via a rotational body 41 to be rotatable in unison therewith and having also an input side rotational member 71 operably coupled to a sun gear shaft 52 in the form of a cylindrical shaft of the planetary transmission section P to be rotatable in unison therewith.

Figure 2:
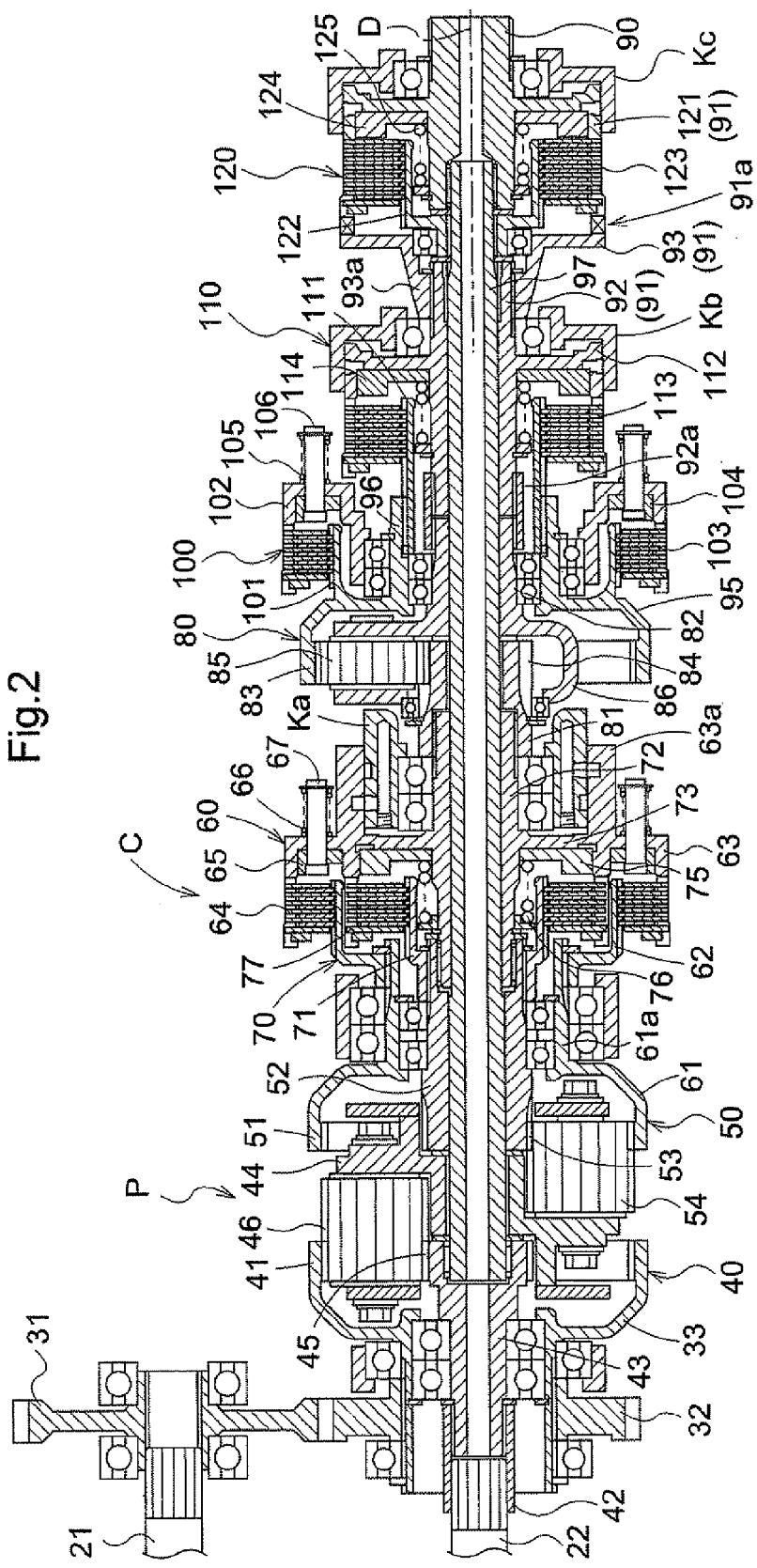
FIG. 2 a section view showing a composite planetary transmission section, a clutch section, a speed-reducing planetary transmission mechanism, a brake mechanism, an operable coupling clutch mechanism and an output clutch mechanism, FIG. 3 a view showing layout of planet gears of an upstream planetary transmission mechanism and planet gears of a downstream planetary transmission mechanism, FIG. 4 a block diagram of an operating device, FIG. 5 an explanatory view illustrating relationship between operational conditions of a first clutch mechanism, a second clutch mechanism, an operable coupling clutch mechanism, and an output clutch mechanism and speed ranges of the speed changing transmission apparatus, FIG. 6 an explanatory view illustrating relationship among speed changing conditions of a stepless speed changing section, output speeds of an output shaft, and speed ranges of the speed changing transmission apparatus, FIG. 7 an explanatory view illustrating ratios of rotational speeds of an output shaft relative to engine rotational speeds, and ratios of rotational speeds of a sun gear of the speed-reducing planetary transmission mechanism and the ring gear rotational speeds relative to engine rotational speeds, FIG. 8 a diagram of a transmission apparatus of a tractor mounting a speed changing transmission apparatus according to a second embodiment, FIG. 9 a diagram of a transmission apparatus of a tractor according to a third embodiment, FIG. 10 a section view showing a planetary transmission section, a clutch section, a speed-reducing planetary transmission mechanism, a brake mechanism, an operable coupling clutch mechanism and an output clutch mechanism in the third embodiment, FIG. 11 a block diagram of an operating device in the third embodiment, FIG. 12 a section view showing a planetary transmission section and a clutch section in the third embodiment, FIG. 13 a section view showing a speed-reducing planetary transmission mechanism, a brake mechanism, an operable coupling clutch mechanism and an output clutch mechanism in the third embodiment, FIG. 14 a horizontal section showing an oil passage forming block in the third embodiment, FIG. 15 a side view showing the oil passage forming block in the third embodiment, FIG. 16 a diagram of a transmission apparatus of a tractor including a speed changing transmission apparatus according to a further embodiment, FIG. 17 a diagram of a transmission apparatus including a previously developed speed changing transmission apparatus, FIG. 18 an explanatory view illustrating relationship among speed changing conditions of a stepless speed changing device, speed ranges and output speeds of the previously developed speed changing transmission apparatus, and FIG. 19 an explanatory view illustrating relationship between respective clutches, the brake and speed ranges of the previously developed speed changing transmission apparatus.

As shown in FIG. 1 and FIG. 2, the speed changing transmission section Z includes a clutch section C having the input side rotational member 62 and the input side rotational member 71, a speed-reducing planetary transmission mechanism 80 (referred to as "speed-reducing planetary mechanism 80" hereinafter) having a sun gear shaft 81, in the form of a cylindrical shaft, coupled to an output shaft portion 72, in the form of a cylindrical shaft, of the clutch section C, to be rotatable in unison therewith, and an operable coupling body 91 operably coupling a carrier shaft 82 in the form of a cylindrical shaft, of the speed-reducing planetary mechanism 80 to the output shaft 90 to be rotatable in unison therewith.

The speed changing transmission apparatus A relating to the present embodiment includes a rotational body 95 formed continuously with the ring gear 83 of the speed-reducing planetary mechanism 80 to be rotatable in unison therewith, a brake mechanism 100 provided between this rotational body 95 and a transmission case K, an operable coupling clutch mechanism 110 provided between the rotational body 95 and the operable coupling body 91, a rotational shaft 97 having one end portion thereof coupled with the carrier 44 of the planetary transmission section P to be rotatable in unison therewith, and an output clutch mechanism 120 provided between the other end of the rotational shaft 97 and the operable coupling body 91.

As shown in FIG. 1 and FIG. 2, the operable coupling body 91 includes a cylindrical shaft 92 having one end thereof coupled via a coupling tool 92a to the carrier shaft 82 to be rotatable in unison therewith, a rotational wheel body 93 having a boss portion 93a thereof coupled to the other end of the cylindrical shaft 92, and a rotational member 121 operably coupling the rotational wheel body 93 to the output shaft 90. As shown in FIG. 2, the rotational wheel body 93 and the rotational member 121 are operably coupled with each other to be rotatable together, via an operable coupling device 91a comprised of engagement between a recess provided in one of these and a projection provided in the other of the same. The rotational member 121 and the output shaft 90 are formed integral with each other.

The stepless speed changing section 20 includes an axial plunger type and variable displacement type hydraulic pump 23 having the input shaft 21 as a pump shaft thereof (the input shaft will be referred to as the pump shaft 21 hereinafter), and an axial plunger type hydraulic motor 24 driven by pressure oil from this hydraulic pump 23. The hydraulic motor 24 includes the above-described motor shaft 22. The stepless speed changing section 20 is constructed as a hydrostatic stepless speed changing device.

That is to say, the stepless speed changing section 20 is switched over into a forward rotation transmitting state, a neutral state or a reverse rotation transmitting state, in response to a change in the swash plate angle of the hydraulic pump 23. With the stepless speed changing section 20, when being switched over into the forward rotation transmitting state, in response to a change in the swash angle of the hydraulic pump 23, the drive force from the engine 1 is converted into a drive force in the forward rotational direction and also speed-changed steplessly to be outputted from the motor shaft 22. With the stepless speed changing section 20, when being switched over into the reverse rotation transmitting state, in response to a change in the swash angle of the hydraulic pump 23, the drive force from the engine 1 is converted into a drive force in the reverse rotational direction and also speed-changed steplessly to be outputted from the motor shaft 22. The stepless speed changing section 20, when switched over into the neutral state, stops output from the motor shaft 22.

FIG. 2 shows a sectional construction of the planetary transmission section P. As shown in this figure and also in FIG. 1, the planetary transmission section P includes a planetary transmission mechanism 40 (to be referred to as an upstream planetary mechanism 40 hereinafter) disposed on the upstream side in the transmission direction (transmission-wise upstream) for transmitting the drive force inputted from the pump shaft 21 and the motor shaft 22 of the stepless speed changing section 20 to the clutch section C, and a planetary transmission mechanism 50 (to be referred to as a downstream planetary mechanism 50 hereinafter) disposed on the downstream side in the transmission direction (transmission-wise downstream).

The upstream planetary mechanism 40 includes, in addition to the sun gear shaft 43 described above, a sun gear 45 supported to one end of this sun gear shaft 43 to be rotatable therewith, three planet gears 46 distributed along the peripheral direction of the sun gear 45 on the outer peripheral side of this sun gear 45 and meshed with the sun gear 45, the carrier 44 rotatably supporting these three planet gears 46, and the ring gear 41 meshed with the three planet gears 46. The sun gear 45 and the sun gear shaft 43 are formed integral with each other. The ring gear 41 is formed integral at the outer peripheral portion of the rotational body 33 described above.

The downstream planetary mechanism 50 includes, in addition to the sun gear shaft 52 described above, a sun gear 53 supported to one end of this sun gear shaft 52 to be rotatable therewith, three planet gears 54 distributed along the peripheral direction of the sun gear 53 on the outer peripheral side of this sun gear 45 and meshed with the sun gear 45, the carrier 44 rotatably supporting these three planet gears 54, and the ring gear 51 meshed with the three planet gears 54. The sun gear 53 and the sun gear shaft 52 are formed integral with each other. The ring gear 51 is formed integral at the outer peripheral portion of the rotational body 61 described above.

Figure 3:
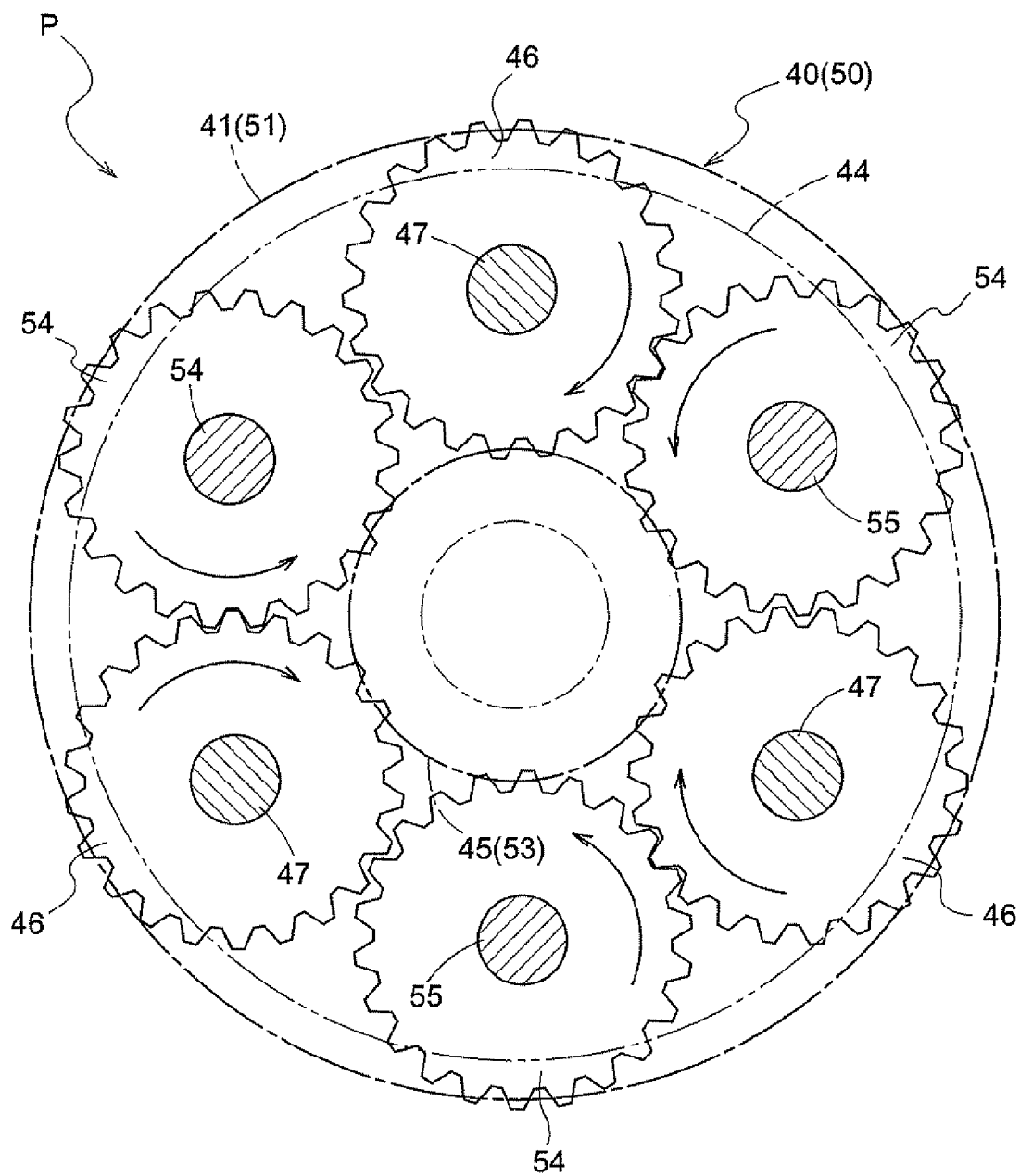

FIG. 3 is a layout view of the planet gears 46 of the upstream planetary mechanism 40 and the planet gears 54 of the downstream planetary mechanism 50. As shown in this figure as well as in FIG. 2, referring more particularly to the three planet gears 46 of the upstream planetary mechanism 40 and the three planet gears 54 of the downstream planetary mechanism 50, one planet gear 46 of the upstream planetary mechanism 40 and one planet gear 54 of the downstream planetary mechanism 50 make up a pair of gears adjacent in the peripheral direction of the sun gears 45, 53. Another planet gear 46 of the upstream planetary mechanism and another planet gear 46 of the downstream planetary mechanism 50 make up a pair of gears adjacent in the peripheral direction of the sun gears 45, 53. The remaining planet gear 46 of the upstream planetary mechanism 40 and the remaining planet gear 46 of the downstream planetary mechanism 50 make up a pair of gears adjacent in the peripheral direction of the sun gears 45, 53. In each gear pair, the planet gear 46 of the upstream planetary mechanism 40 and the planet gear 54 of the downstream planetary mechanism 50 are meshed and operably coupled with each other at the ends of the respective planet gears 46, 54 opposite to the sides meshed with the sun gears 45, 53.

In two gear pairs adjacent each other, tooth crests of the planet gears 46, 54 of one gear pair are inserted between tooth crests of the planet gears 54, 46 of the other gear pair. However, in the two gear pairs adjacent each other, the planet gears 46, 54 of one gear pair are not operably coupled with the planet gears 54, 46 of the other gear pair. By adopting this arrangement inserting the tooth crests of the planet gears 46, 54 between the tooth crests, it is possible to minimize the diameters of the sun gears 45, 53 and the ring gears 41, 52, while providing the planetary transmission section P with required gear ratios, thus achieving compact construction with minimized outer diameter of the planetary transmission section P.

The carrier 44 is constructed as a common carrier shared by the upstream planetary mechanism 40 and the downstream planetary mechanism 50. More particularly, the carrier 44 supports the respective planet gears 46, 54 such that each planet gear 46 of the upstream planetary mechanism 40 revolves about its own axis, as being meshed with the planet gear 54 of the downstream planetary mechanism 50 making the gear pair therewith and revolves at the same time about the sun gear 45, and such that each planet gear 53 of the downstream planetary mechanism 50 revolves about its own axis, as being meshed with the planet gear 46 of the upstream planetary mechanism 40 making the gear pair therewith and revolves at the same time about the sun gear 53.

That is to say, with the planetary transmission section P in operation, the drive force of the pump shaft 21 is inputted, as an engine drive force not subjected to any speed changing function by the stepless speed changing section 20, to the ring gear 41 of the upstream planetary mechanism 40 via the gear 31, the gear 32 and the rotational body 33; the output from the motor shaft 22 of the stepless speed changing section 20 is inputted to the sun gear 45 of the upstream planetary mechanism 40 via the operable coupling tool 42 and the sun gear shaft 43, and the two inputs are synthesized with each other by the upstream planetary mechanism 40 and the downstream planetary mechanism 50; and this synthesized drive force is outputted from the ring gear 51 of the downstream planetary mechanism 50 via the rotational body 61 to the clutch section C and outputted from the sun gear 53 of the downstream planetary mechanism 50 to the clutch section C via the sun gear shaft 52.

FIG. 2 shows a cross sectional construction of the clutch section C. As shown in this figure and also in FIG. 1, the clutch section C includes a first clutch mechanism 60 having the input side rotational member 62 and a second clutch mechanism 70 having the input side rotational member 71.

The first clutch mechanism 60 includes, in addition to the input side rotational member 62 in the form of a cylindrical shaft, an output side rotational member 63 having a cylindrical portion disposed on the outer peripheral side of the input side rotational member 62, a clutch body 64 provided between the input side rotational member 62 and the cylindrical portion of the output side rotational member 63, and a hydraulic piston 65 in the form of a ring provided slidably within the output side rotational member 63.

A connecting portion disposed at one end side of the input side rotational member 62 and a connecting cylindrical portion 61a formed continuously with the one end side of the rotational body 61 are engaged with each other via a spline type engaging device, so that the input side rotational member 62 is rotatable in unison with the rotational body 61. The output shaft portion 72, functioning also as an attaching cylinder formed integral with the inner peripheral side of the output side rotational member 63, and the sun gear shaft 81 are engaged with each other via a spline type engaging device, so that the output side rotational member 63 is rotatable in unison with the sun gear 84 of the speed-reducing planetary mechanism 80. The clutch body 64 includes a plurality of sheets of clutch plates provided on the input side rotational member 62 and juxtaposed along the rotational axis thereof to be rotatable together, and a plurality of sheets of friction plates provided on the output side rotational member 63 and juxtaposed along the rotational axis thereof to be rotatable together.

That is to say, the clutch body 64 is comprised as a multiple plate type and also friction type. With the hydraulic piston 65 in operation, as operational oil is fed or discharged by an operational oil passage provided between a support portion Ka of the transmission case K and an operational portion 63a of the output side rotational member 63, the piston 65 is slidably operated by the pressure of the operational oil and the operating force of a return spring 66, thereby compressing the clutch body 64 or releasing this compression. The return spring 66 is retained at one end side of a support pin 67 slidably supported to the output side rotational member 63, so that the return spring 66 slidably operates the hydraulic piston 65 toward the clutch disengaging side via this support pin 67. The support pins 67 are distributed on the hydraulic piston 65 along its peripheral direction, the return spring 65 being attached to each support pin 67.

The first clutch mechanism 60 is switched over into the engaged state when the clutch body 64 is pressed by the hydraulic piston 65. Then, the first clutch mechanism 60 operably couples the input side rotational member 62 with the output side rotational member 63 to be rotatable together via the clutch body 64. So, the drive force transmitted from the ring gear 51 of the downstream planetary mechanism 50 via the rotational body 61 to the input side rotational member 62 is transmitted from the output shaft portion 72 of the output side rotational member 63 to the sun gear 84 of the speed-reducing planetary mechanism 80.

The first clutch mechanism 60 is switched over into the disengaged state when the pressing of the clutch body 64 by the hydraulic piston 65 is released. Then, the first clutch mechanism 60 releases the operable coupling between the input side rotational member 62 and the outside rotational member 63 by the clutch body 64, thereby breaking transmission of the drive force which has been transmitted from the ring gear 51 to the input side rotational member 62, to the sun gear 84.

The second clutch mechanism 70 includes, in addition to the input side rotational member 71 in the form of a cylindrical shaft, an output side rotational member 73 having a cylindrical portion disposed on the outer peripheral side of the input side rotational member 71, a clutch body 77 provided between the input side rotational member 71 and the output side rotational member 73, and a hydraulic piston 75 provided slidably within the output side rotational member 73.

A connecting portion disposed at one end side of the input side rotational member 71 and an end side of the sun gear shaft 52 are engaged with each other via a spline type engaging device, so that the input side rotational member 71 is rotatable in unison with the sun gear shaft 52. The output side rotational member 73 is formed integral with the output side rotational member 63 of the first clutch mechanism 60 and operably coupled with the sun gear 84 of the speed-reducing planetary mechanism 80 via the output shaft portion 72 to be rotatable therewith. The clutch body 77 includes a plurality of sheets of clutch plates provided on the input side rotational member 71 and juxtaposed along the rotational axis thereof to be rotatable together and a plurality of sheets of friction plates provided on the output side rotational member 73 and juxtaposed along the rotational axis thereof to be rotatable together. The clutch body 77 is comprised as a multiple plate type and also friction type. With the hydraulic piston 75 in operation, as operational oil is fed or discharged by the operational oil passage provided between the support portion Ka of the transmission case K and the operational portion 63a of the output side rotational member 73, the piston 75 is slidably operated by the pressure of the operational oil and the operating force of a return spring 76, thereby compressing the clutch body 77 or releasing this compression.

The second clutch mechanism 70 is switched over into the engaged state when the clutch body 77 is pressed by the hydraulic piston 75. The second clutch mechanism 70 operably couples the input side rotational member 71 with the output side rotational member 73 rotatable together via the clutch body 77. So, the drive force transmitted from the sun gear 53 of the downstream planetary mechanism 50 via the sun gear shaft 52 to the input side rotational member 71 is transmitted from the output shaft portion 72 of the output side rotational member 73 to the sun gear 84 of the speed-reducing planetary mechanism 80.

The second clutch mechanism 70 is switched over into the disengaged state when the pressing of the clutch body 77 by the hydraulic piston 75 is released. Then, the second clutch mechanism 70 releases the operable coupling between the input side rotational member 71 and the outside rotational member 73 by the clutch body 77, thereby breaking transmission of the drive force which has been transmitted from the sun gear 53 to the input side rotational member 71, to the sun gear 84.

FIG. 2 shows a sectional construction of the speed-reducing planetary mechanism 80. As shown in this figure and also in FIG. 1, the speed-reducing planetary mechanism 80 includes the sun gear shaft 81, the carrier shaft 82, the sun gear 84 and the ring gear 83, and further includes a plurality of planet gears 85 distributed along the peripheral direction of the sun gear 84 on the outer peripheral side of the sun gear 84 and meshed with the same, and a carrier 86 rotatably supporting these plural planet gears 85. The sun gear 84 and the sun gear shaft 81 are formed integral with each other. The carrier 86 and the carrier shaft 82 are formed integral with each other. The speed-reducing planetary mechanism 80 inputs the drive force outputted from the clutch section C to the sun gear 84 to reduce its speed to about ¼ and transmits this speed-reduced drive force from the carrier shaft 82 to the operable coupling body 91.

FIG. 2 shows a sectional structure of the brake mechanism 100. As shown in this figure and FIG. 1, the brake mechanism 100 includes a movable cylinder 101 formed continuous with the rotational body 95, a fixed body 102 fixed to the transmission case K, a brake body 103 provided between this fixed body 102 and the movable cylinder 101, and an annular hydraulic piston 104 provided slidably within the fixed body 102.

The brake body 103 includes a plurality of brake plates provided rotatably in the movable cylinder 101 and juxtaposed along the direction of its rotational axis, and a plurality of friction plates provided in the fixed body 102 and juxtaposed along the direction of the rotational axis of the movable cylinder 101. Hence, the brake body 103 is comprised as a multiple plate type and also friction type. With the hydraulic piston 104 in operation, as operational oil is fed or discharged by an operational oil passage provided between the transmission case K and the fixed body 102, the piston 104 is slidably operated by the pressure of the operational oil and the operating force of a return spring 105, thereby compressing the brake body 103 or releasing this compression. The return spring 105 is retained at one end side of a support pin 106 slidably supported to the fixed body 102, so that the return spring 105 slidably operates the hydraulic piston 104 toward the brake disengaging side via this support pin 106. The support pins 106 are distributed on the hydraulic piston 104 along its peripheral direction, the return spring 105 being attached to each support pin 106.

The brake mechanism 100 is switched over into the engaged state when the brake body 103 is compressed by the hydraulic piston 104. Then, the brake mechanism 100 applies, by its brake body 103, friction braking to the movable cylinder 101, whereby a braking force is applied to the rotational body 95, thereby braking the ring gear 83 of the speed-reducing planetary mechanism 80.

The braking mechanism 100 is switched into the disengaged state in response to release of the compressing of the brake body 103 by the hydraulic piston 104. Then, the braking mechanism 100 releases the friction braking to the movable cylinder 101 by the brake body 103, thereby releasing the braking of the ring gear 83.

FIG. 2 shows a sectional construction of the operable coupling clutch mechanism 110. As shown in this figure and also in FIG. 1, the operable coupling clutch mechanism 110 includes a ring side rotational body 111 acting as a cylindrical input side rotational member supported on the support cylinder 96 provided in the rotational body 95 to be rotatable in unison therewith, a carrier side rotational body 112 acting as an output side rotational member provided on the cylindrical shaft 92 of the operable coupling body 91 to be rotatable in unison therewith, a clutch body 113 provided between the carrier side rotational body 112 and the ring side rotational body 111, and an annular hydraulic piston 114 slidably provided within the carrier side rotational body 112. The carrier side rotational body 112 and the cylindrical shaft 92 are formed integral with each other.

The clutch body 113 includes a plurality of sheets of clutch plates mounted on the ring side rotational body 111 and juxtaposed along the rotational axis thereof to be rotatable together, and a plurality of sheets of friction plates mounted on the carrier side rotational body 112 and juxtaposed along the rotational axis thereof to be rotatable together. Hence, the clutch body 113 is configured as a multiple disc and friction type. The hydraulic piston 114 is slidably operated by feeding/discharging of operational oil by the operational oil passage provided between the carrier side rotational body 112 and the support portion Kb of the transmission case K, thereby compressing or releasing compression of the clutch body 113.

The operable coupling clutch mechanism 110 is switched over into the engaged stage when the clutch body 113 is compressed by the hydraulic piston 114. Then, the operable coupling mechanism 110 operably couples the carrier side rotational member 112 with the ring side rotational member 111 by the clutch body 113, thus operably coupling the rotational body 95 and the carrier shaft 82 with each other to be rotatable in unison. With this, operable coupling mechanism 110 couples the ring gear 83 of the speed-reducing planetary mechanism 80 with the carrier 86 for rotation in unison, thus rendering the speed-reducing planetary mechanism 80 into a condition wherein the sun gear 84, the planet gears 85 and the ring gear 83 are rotated together about the rotational axis of the sun gear 84.

The operable coupling mechanism 110 is switched over into the disengaged state in response to release of the compression of the clutch body 113 by the hydraulic piston 114. Then, the operable coupling mechanism 110 releases the connection between the carrier side rotational member 112 and the ring side rotational member 111 by the clutch body 113, thus releasing the connection between the carrier 86 and the ring gear 83, thus rendering the speed-reducing planetary mechanism 80 into a speed reducing condition.

FIG. 2 shows a sectional construction of the output clutch mechanism 120. As shown in this figure and also in FIG. 1, the output clutch mechanism 120 includes an output side rotational member 121 comprised of the rotational member 121 of the operable coupling body 91, an input side rotational member 122 disposed inside the cylindrical portion of the output side rotational member 121 and provided at the end portion of the rotational shaft 97 to be rotatable in unison therewith, a clutch body 123 provided between the input side rotational member 122 and the output side rotational member 121, and a hydraulic piston 124 slidably provided within the output side rotational member 121.

The clutch body 123 includes a plurality of friction plates mounted on the input side rotational member 122 and juxtaposed along the rotational axis thereof to be rotatable in unison therewith; and a plurality of clutch plates mounted on the output side rotational member 121 and juxtaposed along the rotational axis thereof. Hence, the clutch body 123 is configured as a multiple disc type and also friction type. The hydraulic piston 124 is slidably operated to compress the clutch body 123 or release this compression, by pressure of operational oil and an operational force of a return spring 125 as the operational oil is fed/discharged by the operational oil passage provided between the support portion Kc of the transmission case K and the output side rotational member 121.

The output clutch mechanism 120 is switched into the engaged state when the clutch body 123 is compressed by the hydraulic piston 124. Then, the output clutch mechanism 120 operably couples the input side rotational member 122 with the output side rotational member 121 via the clutch body 123 to be rotatable in unison. So that, the drive force which has been transmitted to the input side rotational member 122 by the rotational shaft 97 from the carrier 44 of the planetary transmission section P is transmitted from the output side rotational member 121 to the output shaft 90. Further, the output clutch mechanism 120 transmits the drive force of the input side rotational member 122 to the cylindrical shaft 92.

The output clutch mechanism 120 is switched into the disengaged state when the clutch body 123 releases its compressing to the hydraulic piston 124. Then, the output clutch mechanism 120 releases the operable connection between the input side rotational member 122 and the output rotational body 121 by the clutch body 123, thereby breaking the force transmission from the carrier 44 of the planetary transmission section P to the output shaft 90 and also rendering the operable coupling body 91 and the rotational shaft 97 rotatable relative to each other so that the drive force of the carrier 86 of the speed-reducing planetary mechanism 80 may be transmitted to the output shaft 90.

The rotational shaft 97 is arranged to be inserted through the sun gear 53 of the planetary transmission section P, the input side rotational members 62, 71 and the output side rotational members 63, 73 of the first clutch mechanism 60 and the second clutch mechanism 70 of the clutch section C, the sun gear 84 of the speed-reducing planetary mechanism 80, and the carrier side rotational member 112 and the ring side rotational member 111 of the operable coupling clutch mechanism 110.

The planetary transmission section P, the first clutch mechanism 60 and the second clutch mechanism 70 of the clutch section C, the speed-reducing planetary mechanism 80, the operable coupling clutch mechanism 110, the output clutch mechanism 120 and the output shaft 90 are rotatable about a same rotational axis D. This rotational axis D coincides with the axis of the rotational shaft 97.

As shown in FIG. 1, the forward/reverse switchover device 10 includes, in addition to the input shaft 11 and the output shaft 12, a forward transmission member 13 supported on the input shaft 11 to be rotatable in unison therewith, a reverse gear mechanism 14 having an input gear 14*a* operably coupled with the input shaft 11, a reverse transmission member 15 operably coupled with an output gear 14*b* of the reverse gear mechanism 14, an output member 16 supported on the output shaft 12 to be rotatable in unison therewith, a forward clutch 17 provided between this output member 16 and the forward transmission member 13 and a reverse clutch 18 provided between the output member 16 and the reverse transmission member 15.

The forward/reverse switchover device 10 is rendered into a forward transmission condition when the forward clutch 17 is operated into the engaged state and the reverse clutch 18 is operated into the disengaged state. Then, the forward/reverse switchover device 10 transmits the drive force of the input shaft 11 driven by the output shaft 90 of the speed changing transmission apparatus A to the output shaft 12 via the forward transmitting member 13, the forward clutch 17 and the output member 16, so that the power is transmitted from this output shaft 12 to the rear wheel differential mechanism 3 and the front wheel transmission shaft 5.

The forward/reverse switchover device 10 is rendered into a reverse transmission condition when the forward clutch 17 is operated into the disengaged state and the reverse clutch 17 is operated into the engaged state. Then, the forward/reverse switchover device 10 transmits the drive force of the input shaft 11 to the output shaft 12 via the reverse gear mechanism 14, the reverse transmission member 15, the reverse clutch 18 and the output member 16, so that the force is transmitted from this output shaft 12 to the rear wheel differential mechanism 3 and the front wheel transmission shaft 5.

Figure 4:
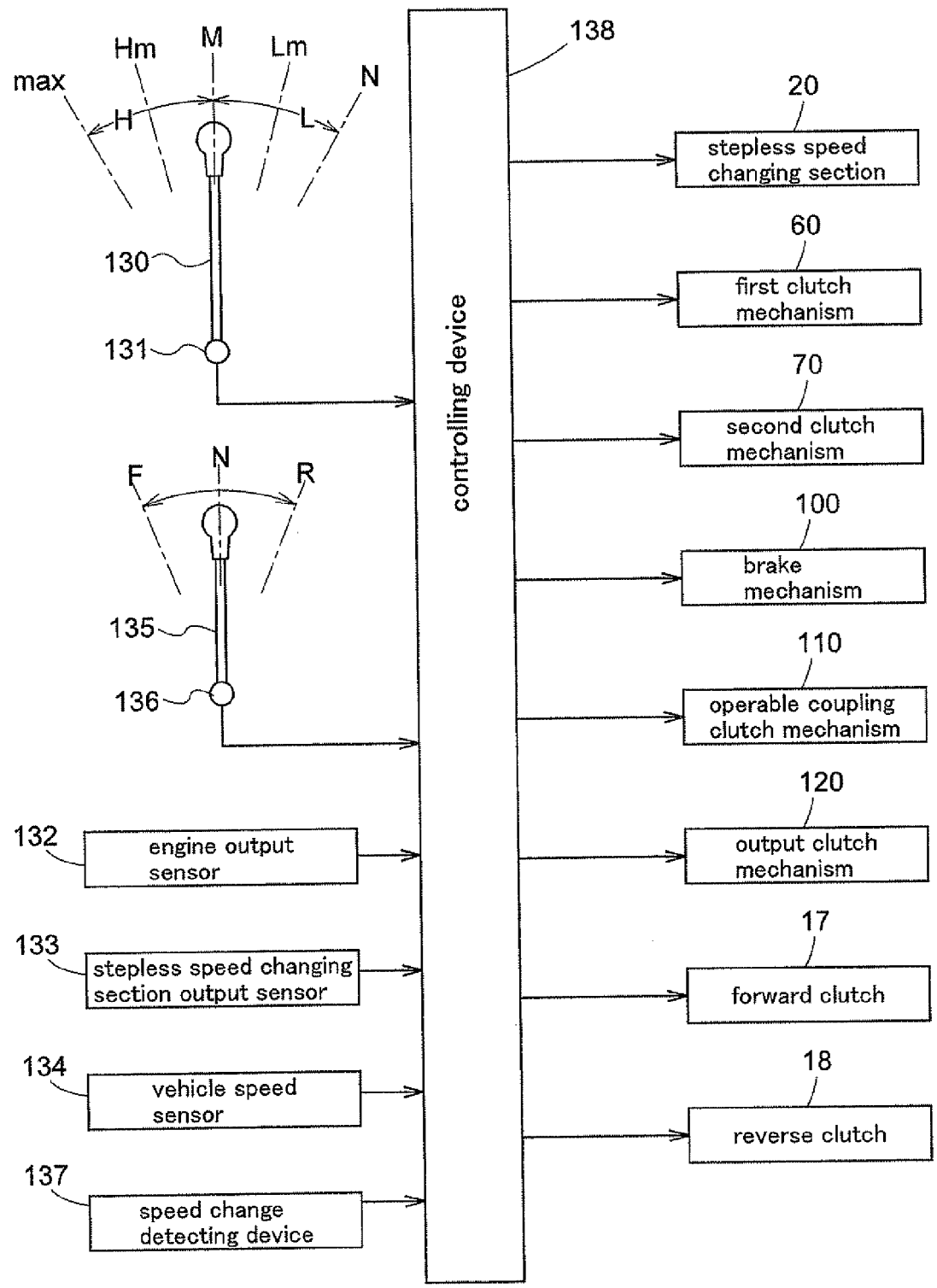

FIG. 4 is a block diagram of an operating device mounted on the tractor for operating the traveling transmission apparatus. As shown in this figure, this operating device includes a speed changing lever 130, a speed changing operation detecting device 131, an engine output sensor 132, a stepless speed changing section output sensor 133, a vehicle speed sensor 134, a forward/reverse lever 135, a forward/reverse detecting device 136, a speed change detecting device 137 and a controlling device 138 operably linked with the respective detecting devices 131, 136 and the respective sensors 132, 133, 134, 137.

The controlling device 138 is operably coupled with an operating portion (not shown) of an actuator (not shown) for varying a swash angle of the hydraulic pump 23 of the stepless speed changing section 20. The controlling device 138 is operably coupled with operating valves for operating the hydraulic pistons 65, 75, 104, 114, 124 of the first clutch mechanism 60, the second clutch mechanism 70, the brake mechanism 100, the operable coupling clutch mechanism 110 and the output clutch mechanism 120. The controlling device 138 is operably coupled with an actuator (not shown) for switching over the forward clutch 17 and the reverse clutch 18.

As shown in FIG. 4, the speed changing lever 130 is pivotable over an operational range from a neutral position N to the maximum speed position (max). In this operational range, the portion from the neutral position N to an intermediate position M is a low speed range L and the portion from the intermediate position M to the maximum speed position (max) is a high speed range H.

The speed changing operation detecting device 131 is comprised of a rotation potentiometer operably coupled with the speed changing lever 130. This speed changing operation detecting device 131 detects an operational position of the speed changing lever 130 and outputs the detection result to the controlling device 138.

The engine output sensor 132, the stepless speed changing section output sensor 133, and the vehicle speed sensor 134 are comprised of rotation sensors. The engine output sensor 132 detects an output speed of the engine 1 and outputs the detection result to the controlling device 138. The stepless speed changing section output sensor 133 detects an output speed of the motor shaft 22 of the stepless speed changing section 20 and outputs the detection result to the controlling device 138. The vehicle speed sensor 134 detects the rotational speed of the output shaft 90 as the vehicle speed and feeds back this detection result to the controlling device 138.

The forward/reverse lever 135 switches over to the neutral position N, the forward position F and the reverse position R with pivotal operations. The forward/reverse detecting device 136 is comprised of a rotation potentiometer operably coupled with the forward/reverse lever 135. The forward/reverse detecting device 136 detects an operational position of the forward/reverse lever 135 and outputs this detection result to the controlling device 138.

The controlling device 138 is configured by utilizing a microcomputer. This controlling device 138 operates the first clutch mechanism 60, the second clutch mechanism 70, the brake mechanism 100, the operable coupling clutch mechanism 110 and the output clutch mechanism 120, based on the detection results obtained by the speed changing operation detecting device 131, the speed change detecting device 137, the engine output sensor 132, the stepless speed changing section output sensor 133 and the vehicle speed sensor 134, such that the speed changing transmission section A may be rendered into a speed range as an operational state corresponding to the operational position of the speed changing lever 130, thereby to drive the output shaft 90 at a rotational speed corresponding to the operational position of the speed changing lever 130. The controlling device 138 operates the forward clutch 17 and the reverse clutch 18, based on the detection information obtained by the forward/reverse detecting device 136, such that the forward/reverse switchover device 10 may be rendered into an operational state corresponding to the operational position of the forward/reverse lever 135.

With the above, in response to operations of the speed changing lever 130 and the forward/reverse lever 135, the tractor will travel in the forward or reverse direction corresponding to the operational position of the forward/reverse lever 135 and at a vehicle speed corresponding to the operational position of the speed changing lever 130 and the output speed of the engine 1.

That is, FIG. 5 is an explanatory view showing relationship among operational conditions of the first clutch mechanism 60, the second clutch mechanism 70, the bake mechanism 100, the operable coupling clutch mechanism 110 and the output clutch mechanism 120 and the speed ranges of the speed changing transmission section A. The mark "ENGAGED" shown in FIG. 5 denotes the engaged states of the first clutch mechanism 60, the second clutch mechanism 70, the bake mechanism 100, the operable coupling clutch mechanism 110 and the output clutch mechanism 120. The mark "-" shown in FIG. 5 denotes the disengaged states of the first clutch mechanism 60, the second clutch mechanism 70, the bake mechanism 100, the operable coupling clutch mechanism 110 and the output clutch mechanism 120.

FIG. 6 is an explanatory view showing relationship among the speed changing conditions of the stepless speed changing section 20, the output speeds by the output shaft 90, and the speed ranges of the speed changing transmission section A. The vertical axis shown in FIG. 6 represents the drive speed, i.e. the output rotational speed (referred to as output speed hereinafter) of the output shaft 90. The horizontal axis shown in FIG. 6 represents the speed changing condition of the stepless speed changing section 20. The sign "−MAX" shown along the horizontal axis denotes the maximum speed under the reverse rotation transmission condition of the stepless speed changing section 20. The mark "0" along the horizontal axis represents the neutral state of the stepless speed changing section 20. The sign "+MAX" shown along the horizontal axis denotes the maximum speed under the forward rotation transmission condition of the stepless speed changing section 20.

As shown in these figures, when the speed changing lever 130 is operated from the neutral position N to an intermediate position Lm in the low speed range L (will be referred to as a low speed intermediate position Lm hereinafter), the controlling device 138 operates the first clutch mechanism 60 and the brake mechanism 100 into the engaged states and operates the second clutch mechanism 70, the operable coupling clutch mechanism 110 and the output clutch mechanism 120 into the disengaged states, whereby the speed changing transmission apparatus A is operated into the first speed range. Then, the speed changing transmission apparatus A transmits the drive force of the ring gear 51 of the planetary transmission section P via the rotational body 61 and the first clutch mechanism 60 to the sun gear 84 of the speed-reducing planetary mechanism 80, so that the output from the carrier 86 of this speed-reducing planetary mechanism 80 is transmitted via the carrier shaft 82 and the operable coupling body 91 to the output shaft 90. And, as the speed changing lever 130 is operated from the neutral position N toward the low-speed intermediate position Lm, the controlling device 138 effects the speed change of the stepless speed changing section 20 from "−MAX" toward "+MAX", so that the output speed is increased steplessly from "0". When the speed changing lever 130 reaches the low speed intermediate position Lm, the controlling device 138 operates the stepless speed changing section 20 to "+MAX", so that the output speed becomes "V1".

When the speed changing lever 130 is operated from the low speed intermediate position Lm to an intermediate position M in the low speed range L, the controlling device 138 operates the second clutch mechanism 70 and the brake mechanism 100 into the engaged states and operates the first clutch mechanism 60, the operable coupling clutch mechanism 110 and the output clutch mechanism 120 into the disengaged states, whereby the speed changing transmission apparatus A is operated into the second speed range. Then, the speed changing transmission apparatus A transmits the drive force of the sun gear 53 of the planetary transmission section P via the sun gear shaft 52 and the second clutch mechanism 70 to the sun gear 84 of the speed-reducing planetary mechanism 80, so that the output from the carrier 86 of this speed-reducing planetary mechanism 80 is transmitted via the carrier shaft 82 and the operable coupling body 91 to the output shaft 90. And, as the speed changing lever 130 is operated from the low-speed intermediate position Lm toward the intermediate position M, the controlling device 138 effects the speed change of the stepless speed changing section 20 from "+MAX" toward "−MAX", so that the output speed is increased steplessly from "V1". When the speed changing lever 130 reaches the intermediate position M, the controlling device 138 operates the stepless speed changing section 20 to "−MAX", so that the output speed becomes "V2".

When the speed changing lever 130 is operated from the neutral position N to an intermediate position Hm in the high speed range H (will be referred to as an high-speed intermediate position Hm hereinafter), the controlling device 138 operates the operable coupling clutch mechanism 110 and the output clutch mechanism 120 into the engaged states and operates the first clutch mechanism 60, the second clutch mechanism 70 and the brake clutch mechanism 100 into the disengaged states, whereby the speed changing transmission apparatus A is operated into the third speed range. Then, the speed changing transmission apparatus A transmits the drive force of the carrier 44 of the planetary transmission section P via the rotational shaft 97 and the output clutch mechanism 120 to the output shaft 90. And, as the speed changing lever 130 is operated from the intermediate position M toward the high-speed intermediate position Hm, the controlling device 138 effects the speed change of the stepless speed changing section 20 from "−MAX" toward "+MAX", so that the output speed is increased steplessly from "V2". When the speed change lever 10 reaches the high-speed intermediate position Mm, the controlling device 138 operates the stepless speed changing section 20 to "+MAX", so that the output speed becomes "V3".

When the speed changing lever 130 is operated from the high speed intermediate position Hm to the maximum speed position (max) in the high speed range H, the controlling device 138 operates the second clutch mechanism 70 and the operable coupling clutch mechanism 110 into the engaged states and operates the first clutch mechanism 60, the brake mechanism 100 and the output clutch mechanism 120 into the disengaged states, whereby the speed changing transmission apparatus A is operated into the fourth speed range. Then, the speed changing transmission apparatus A transmits the drive force of the sun gear 53 of the planetary transmission section P via the sun gear shaft 52 and the second clutch mechanism 70 to the sun gear 84 of the speed-reducing planetary mechanism 80, so that the output from the carrier 86 of this speed-reducing planetary mechanism 80 is transmitted via the operable coupling body 91 to the output shaft 91. And, as the speed changing lever 130 is operated from the high-speed intermediate position Hm toward the maximum speed position (max), the controlling device 138 effects the speed change of the stepless speed changing section 20 from "+MAX" toward "−MAX", so that the output speed is increased steplessly from "V3". When the speed changing lever 130 reaches the maximum speed position (max), the controlling device 138 operates the stepless speed changing section 20 to "−MAX", so that the output speed becomes "V4".

If the forward/reverse lever 135 is operated to the forward position F, the controlling device 138 operates the forward clutch 17 into the engaged state and operates the reverse clutch 18 into the disengaged state, so that the forward/reverse switchover device 10 is operated into the forward transmission condition. Then, the forward/reverse switchover device 10 transmits, as a forward drive force, the drive force inputted from the output shaft 90 of the speed changing transmission apparatus A, to the rear wheel differential mechanism 3 and the front wheel transmission shaft 5 from the output shaft 12, whereby the tractor effects forward traveling.

If the forward/reverse lever 135 is operated to the reverse position R, the controlling device 138 operates the forward clutch 17 into the disengaged state and operates the reverse clutch 18 into the engaged state, so that the forward/reverse switchover device 10 is operated into the reverse transmission condition. Then, the forward/reverse switchover device 10 transmits, as a reverse drive force, the drive force inputted from the output shaft 90 of the speed changing transmission apparatus A, to the rear wheel differential mechanism 3 and the front wheel transmission shaft 5 from the output shaft 12, whereby the tractor effects reverse traveling.

If the forward/reverse lever 135 is operated to the neutral position N, the controlling device 138 operates the forward clutch 17 and the reverse clutch 18 into the disengaged states, so that the forward/reverse switchover device 10 is operated to the neutral state. Then, the forward/reverse switchover device 10 does not transmit the drive force inputted from the output shaft 90 of the speed changing transmission apparatus A to the output shaft 12, thus breaking force transmission to the rear wheel differential mechanism 3 and the front wheel transmission shaft 5, whereby the tractor is stopped.

When the speed changing transmission apparatus A is operated to the third speed range, this speed changing transmission apparatus A transmits the drive force of the carrier 44 of the planetary transmission section P via the rotational shaft 97 and the output clutch mechanism 120 to the output shaft 90, thereby driving this output shaft 90 and the speed-reducing planetary mechanism 80 does not effect any force transmission. However, when the speed changing transmission apparatus A is operated into the third speed range, the controlling device 138 operates the operable coupling clutch mechanism 110 into the engaged state. With this, the speed changing transmission apparatus A effects the range transcending speed change from one to the other of the third speed range and the fourth speed range, with reduced possibility of speed changing shock from the speed-reducing planetary mechanism 80.

That is, FIG. 7 is an explanatory view illustrating relationship among ratios of rotational speeds of the output shaft 90 in each speed range (will be referred to as "output shaft rotational speed" hereinafter) of the speed changing transmission apparatus A according to the instant embodiment, ratios of the rotational speeds of the sun gear 84 (will be referred to as "sun gear rotational speeds" hereinafter) of the speed-reducing planetary mechanism 80 relative to the engine rotational speeds, and ratios of the rotational speeds of the ring gear 83 (will be referred to as "ring gear rotational speeds" hereinafter) of the speed-reducing planetary mechanism 80 relative to the engine rotational speeds. The horizontal axis in FIG. 7 represents the speed range of the speed changing transmission apparatus A. The vertical axis in FIG. 7 represents the ratios of the output shaft rotational speeds, the sun gear rotational speeds and the ring gear rotational speeds, relative to the engine rotational speeds. The curve Z shown by a solid line in FIG. 7 represents variation in the ratio of the output shaft rotational speed relative to the engine rotational speed, in association with a speed changing operation of the speed changing transmission apparatus A. The curve X shown by a dashed dotted line in FIG. 7 represents variation in the ratio of the sun gear rotational speed relative to the engine rotational speed in association with a speed changing operation of the speed changing transmission apparatus A. The curve Y shown by a dotted line is FIG. 7 represents variation in the ratio of the ring gear rotational speed relative to the engine rotational speed in association with a speed changing operation of the speed changing transmission apparatus A.

As shown in the figures, the ratio of the output shaft rotational speed relative to the engine rotational speed increases from "0" to "0.25" in response to an accelerating operation of the speed changing transmission apparatus A in the first speed range. The ratio increases from "0.25" to "0.5" in response to an accelerating operation of the speed changing transmission apparatus A in the second speed range. The ratio increases from "0.5" to "1.0" in response to an accelerating operation of the speed changing transmission apparatus A in the third speed range. The ratio increases from "1.0" to "2.0" in response to an accelerating operation of the speed changing transmission apparatus A in the fourth speed range.

In FIG. 7, in the third speed range and the fourth speed range, the curve X, the curve Y and the curve Z are slightly apart from each other. This is provided as a measure for making conspicuous the variation in the ratio of the sun gear rotational speed and the ratio of the ring gear rotational speed. In actuality, in the third speed range and the fourth speed range, the curve X, the curve Y and the curve Z will be overlapped with each other to form a single curve.

As shown in the figures, when the speed changing transmission apparatus A is operated into the first speed range and the second speed range, the ring gear 83 of the speed-reducing planetary mechanism 80 is stopped and the sun gear 84 of the speed-reducing planetary mechanism 80 is rotated. This is because the speed-reducing planetary mechanism 80 effects its transmission function. When the speed changing transmission apparatus A is operated into the third speed range, the sun gear 84 and the ring gear 83 of the speed-reducing planetary mechanism 80 are rotated at the same rotational speed as the output shaft 90. That is, the entire speed-reducing planetary mechanism 80 is rotated in unison. This is because the first clutch mechanism 60 and the second clutch mechanism 70 are operated into the disengaged states and the operable coupling mechanism 110 and the output clutch mechanism 120 are operated into the engaged states. When the speed changing transmission apparatus A is operated into the fourth speed range, the sun gear 84 and the ring gear 83 of the speed-reducing planetary mechanism 80 are rotated at the same rotational speed as the output shaft 90. That is, the entire speed-reducing planetary mechanism 80 is rotated in unison.

This is because the second clutch mechanism 70 and the operable coupling clutch 110 are operated into the engaged states.

That is to say, when the speed changing transmission apparatus A is operated into the third speed range, in the case of the operable coupling clutch mechanism 110 being switched over into the disengaged state, in the course of the range transcending speed change operation from the third speed range to the fourth speed range, the speed-reducing planetary mechanism 80 and the output shaft 90, which is being rotated at a higher rotational speed than the case of the range transcending speed change operation between the second speed range and the third speed range, are operably coupled with each other, so that the speed-reducing planetary mechanism 80 will be rotated rapidly at a high rotational speed. In the course of the range transcending speed change operation of the speed changing transmission apparatus A from the fourth speed range to the third speed range, the operable coupling between the speed-reducing planetary mechanism 80 and the output shaft 90, which is being rotated at the high rotational speed is released, so that the speed-reducing planetary mechanism 80 will be stopped abruptly.

On the other hand, according to the speed changing transmission apparatus A of the present embodiment, in the course of the range transcending speed change operation of the speed changing transmission apparatus A from the third speed range to the fourth speed range, the operable coupled rotation of the entire speed-reducing planetary mechanism 80 with the output shaft 90 is maintained, so that no abrupt stop due to the high speed rotational speed of the speed-reducing planetary mechanism 8 occurs.

Figure 8:
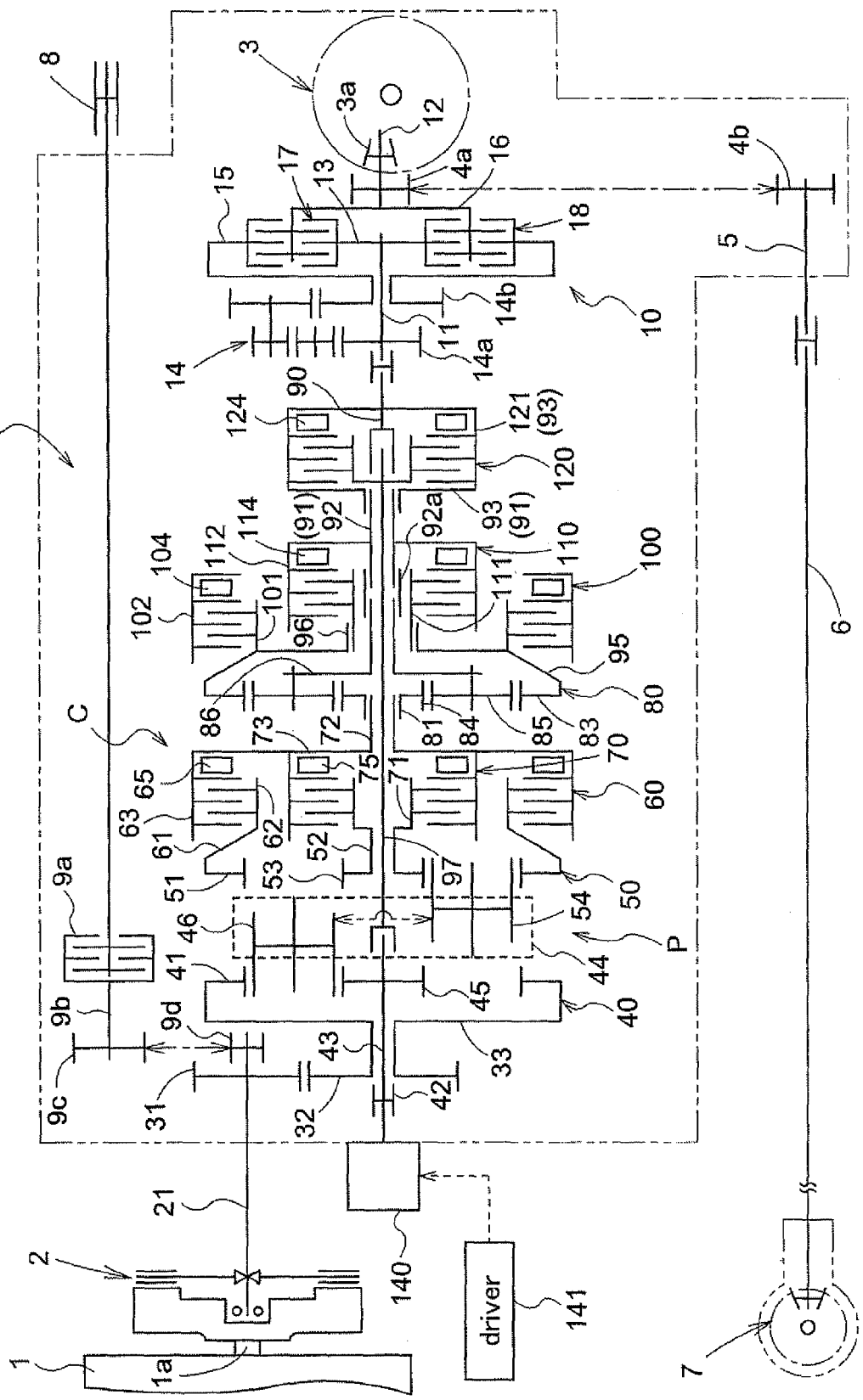

FIG. 8 is a diagram of a transmission system of a tractor mounting a speed changing transmission apparatus A according to a second embodiment of the present invention. As compared with the speed changing transmission apparatus A according to the first embodiment, the speed changing transmission apparatus A according to the second embodiment is identical in constructions, in the respects of the composite planetary transmission section P, the clutch section C, the speed-reducing planetary mechanism 80, the brake mechanism 100, the operable coupling clutch mechanism 110 and the output clutch mechanism 120. Whereas, in the respect of the arrangement of inputting a drive force which can be speed-changed steplessly, the speed changing transmission apparatus A according to the second embodiment differs from the speed changing transmission apparatus A according to the first embodiment. This difference will be described next.

The speed changing transmission apparatus A according to the second embodiment includes an electric motor 140. The composite planetary transmission section P inputs the output from the electric motor 140 to the sun gear 43 of the planetary transmission mechanism 40 disposed on the transmission-wise upstream. The composite planetary transmission mechanism P inputs the output from the output shaft 1a of the engine 1 to the ring gear 41 of the transmission-wise upstream planetary transmission mechanism 40, via the main clutch 2, the input shaft 21, the gear 31 and the gear 32. The planetary transmission section P synthesizes the drive force of the engine 1 and the drive force of the electric motor 140 and transmits the resultant synthesized drive force to the clutch section C.

The electric motor 140 varies the driving rotational speed steplessly in response to a speed changing operation by a driver 141. As this speed changing operation of the electric motor 140 is effected and in accordance with this speed changing operation, the first clutch mechanism 60, the second clutch mechanism 70, the brake mechanism 100, the operable coupling clutch mechanism 110 and the output clutch mechanism 120 are switched over respectively, like the speed changing transmission apparatus A according to the first embodiment, the output speed of the output shaft 90 is changed in four speed stages from the first speed range to the fourth speed range and changed steplessly in each speed stage.

Next, with reference to FIGS. 9-16, a third embodiment will be described.

Figure 9:
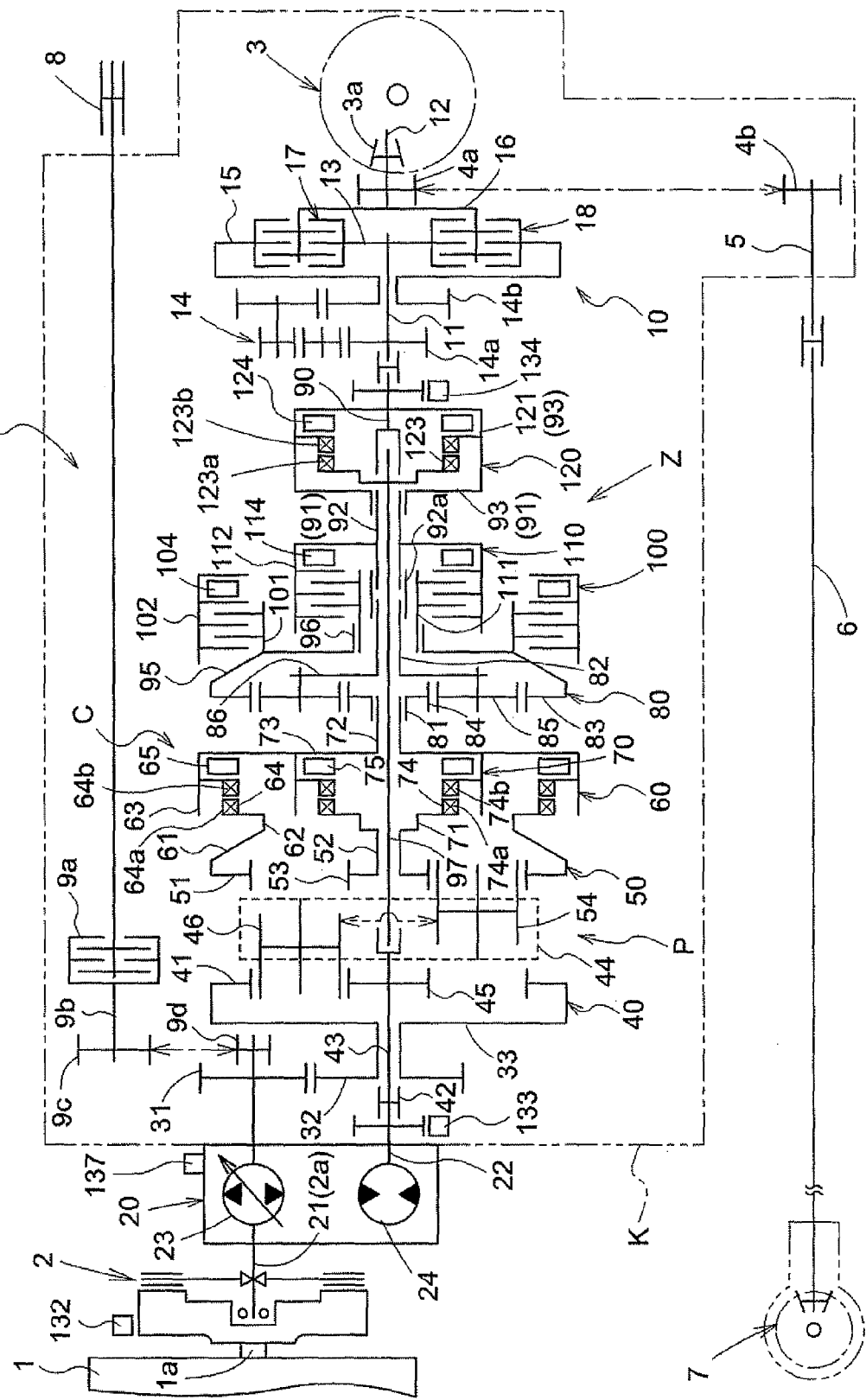
Figure 12:
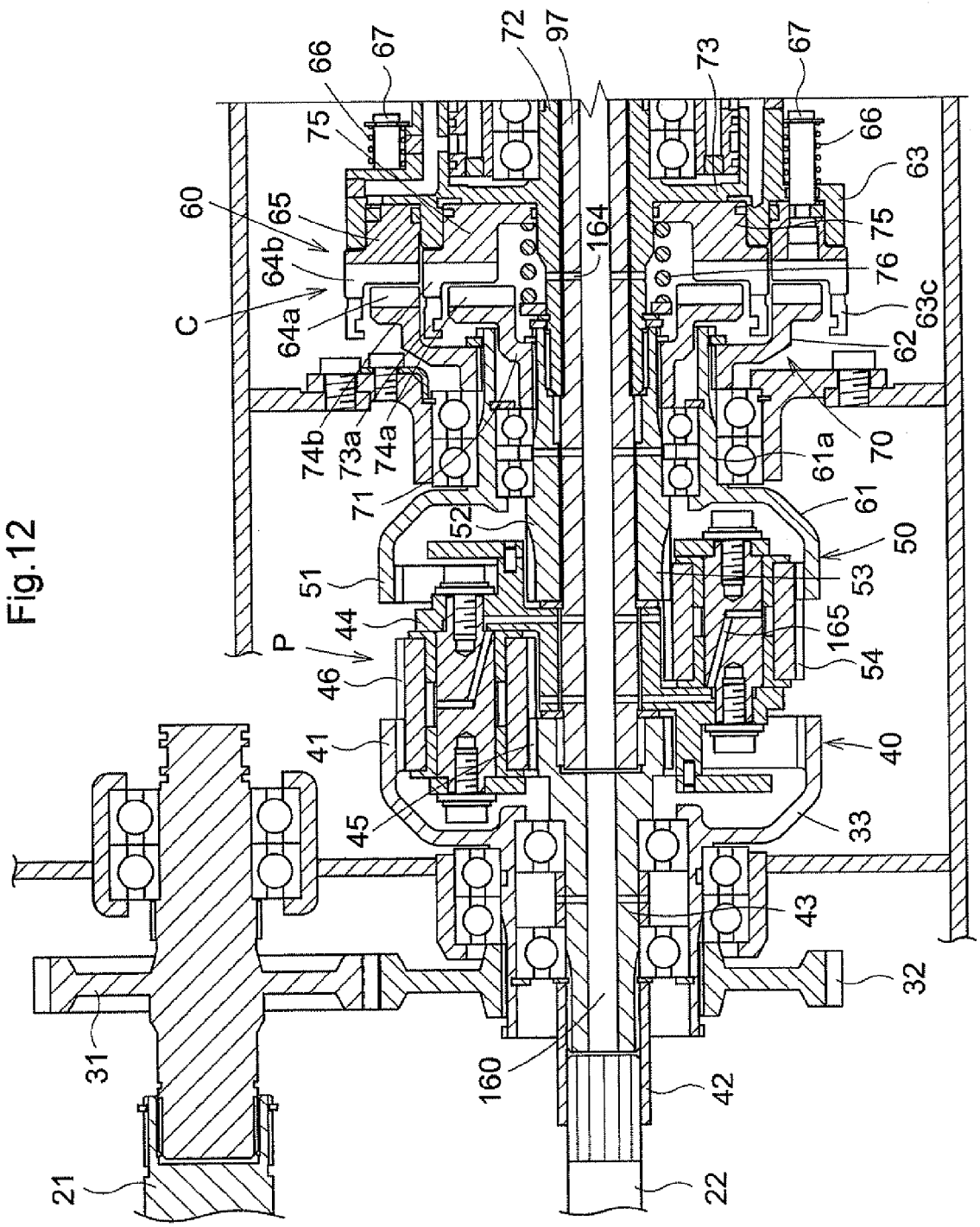
Figure 13:
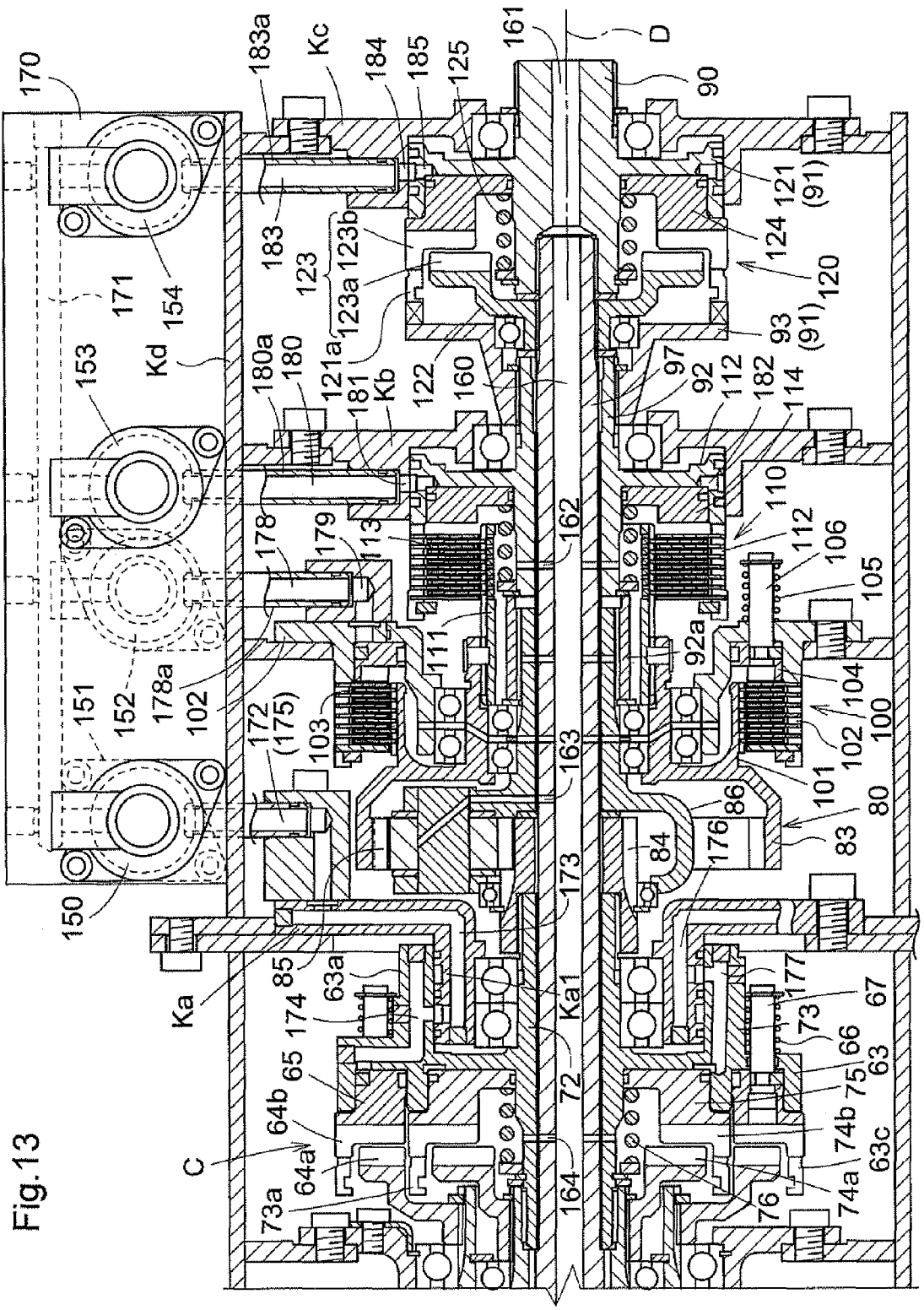

Unlike the first embodiment and the second embodiment, as shown in FIG. 9, FIG. 12 and FIG. 13, the first clutch mechanism 60, the second clutch mechanism 70 and the output clutch mechanism 120 are configured as the meshing type clutches.

More particularly, the clutch body 64 of the first clutch mechanism 60 includes non-operative clutch pawls 64a provided on the lateral face of the input side rotational member 62 and rotatably juxtaposed along the rotational direction of the input side rotational member 62 and operative clutch pawls 64b provided on the one end side of the output rotational body 63 and juxtaposed along the rotational direction of the output rotational body 63. The operative clutch pawls 64b are engaged with retaining portions 63c of the output side rotational member 63 to be rotatable in unison therewith and slidable relative thereto. The operative clutch pawls 64b are formed continuous with the hydraulic piston 65. The hydraulic piston 65 is slidably urged toward the clutch disengaging side by slidable urging of the support pins 67 by a return spring 66 provided between the output side rotational member 63, and the support pin 67 through which the output side rotational member 63 slidably extends.

The first clutch mechanism 60 slidably operates the operative clutch pawls 64b relative to the output rotational body 63 by the hydraulic piston 65. With this, when the operative clutch pawls 64b are meshed with the non-operative clutch pawls 64a to be rotatable in unison therewith, the first clutch mechanism 60 is rendered into the engaged state so as to rotate the input side rotational member 62 and the output side rotational member 63 in unison. When the operative clutch pawls 64b are detached from the operative clutch pawls 64a, the first clutch mechanism 60 is rendered into the disengaged state so as to render the input side rotational member 62 and the output side rotational member 63 rotatable relative to each other.

The clutch body 74 of the second clutch mechanism 70 includes non-operative clutch pawls 74a provided on the lateral face of the input side rotational member 71 and rotatably juxtaposed along the rotational direction of the input side rotational member 71, and operative clutch pawls 74b provided on the one end side of the output rotational member 73 and juxtaposed along the rotational direction of the output rotational member 73. The operative clutch pawls 74b are engaged with retaining portions 73a of the output side rotational member 73 to be rotatable in unison therewith and slidable relative thereto. The operative clutch pawls 74b are formed continuous with the hydraulic piston 75. The hydraulic piston 75 is slidably urged toward the clutch disengaging side by a return spring 76.

The second clutch mechanism 70 slidably operates the operative clutch pawls 74b relative to the output rotational body 73 by the hydraulic piston 75. With this, when the operative clutch pawls 74b are meshed with the non-operative clutch pawls 74a to be rotatable in unison therewith, the second clutch mechanism 70 is rendered into the engaged state so as to rotate the input side rotational member 71 and the output side rotational member 73 in unison. When the operative clutch pawls 74b are detached from the operative clutch pawls 74a, the mechanism is rendered into the disengaged state so as to render the input side rotational member 71 and the output side rotational member 73 rotatable relative to each other.

The clutch body 123 of the output clutch mechanism 120 includes non-operative clutch pawls 123a provided on the lateral face of the input side rotational member 122 and rotatably juxtaposed along the rotational direction of the input side rotational member 122, and operative clutch pawls 123b provided on the one end side of the output rotational member 121 and juxtaposed along the rotational direction of the output rotational member 121. The operative clutch pawls 123b are engaged with retaining portions 121a of the output side rotational member 121 to be rotatable in unison therewith and slidable relative thereto. The operative clutch pawls 123b are formed continuous with the hydraulic piston 124. The hydraulic piston 124 is slidably urged toward the clutch disengaging side by a return spring 125.

The output clutch mechanism 120 slidably operates the operative clutch pawls 123b relative to the output rotational member 121 by the hydraulic piston 124. With this, when the operative clutch pawls 123b are meshed with the non-operative clutch pawls 123a to be rotatable in unison therewith, the output clutch mechanism 120 is rendered into the engaged state so as to rotate the input side rotational member 122 and the output side rotational member 121 in unison. When the operative clutch pawls 123b are detached from the operative clutch pawls 123a, the output clutch mechanism 120 is rendered into the disengaged state so as to render the input side rotational member 122 and the output side rotational member 121 rotatable relative to each other.

Figure 10:
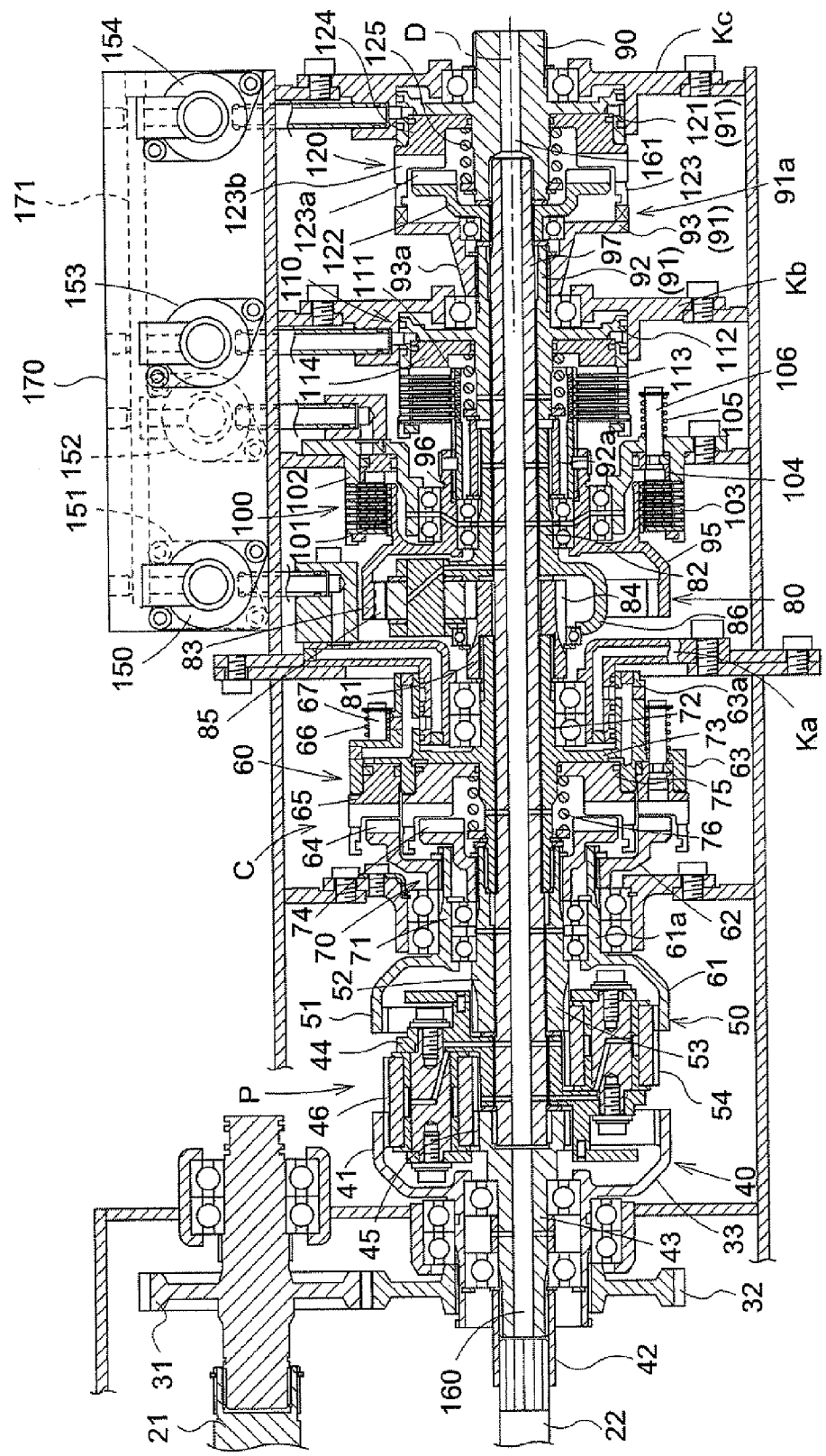

As shown in FIG. 9 and FIG. 10, the rotational shaft 97 provides support to the sun gears 45, 53, 84 of the upstream planetary mechanism 40, the downstream planetary mechanism 50 and the speed-reducing planetary mechanism 80, the output side rotational member 73 of the second clutch mechanism 70 and the carrier side rotational member 112 of the operable coupling clutch mechanism 110 and provides also support to the output side rotational member 63 of the first clutch mechanism 60.

That is to say, the rotational shaft 97 functions as a support shaft for supporting the upstream planetary mechanism 40, the downstream planetary mechanism 50, the first clutch mechanism 60, the second clutch mechanism 70, the speed-reducing planetary mechanism 80 and the operable coupling clutch mechanism 110.

As shown in FIG. 10, FIG. 12 and FIG. 13, the rotational shaft 97 includes an oil feeding passage 160 defined in this rotational shaft 97 in the direction along the axis of the rotational shaft 97 and coaxially therewith. This oil feeding passage 160 receives lubricant oil from an oil passage 161 defined in the output shaft 90. The oil feeding passage 160 feeds the lubricant oil fed from the oil passage 161 to the operable coupling clutch mechanism 110 via a distributing oil passage 162 provided between and across the cylindrical shaft 92 and the rotational shaft 97. The oil feeding passage 160 feeds the lubricant oil fed from the oil passage 161 to the gaps between the planet gears 85 of the speed-reducing planetary mechanism 80 and the support shaft via a distributing oil passage 163 provided between the carrier 86 and the rotational shaft 97. The oil feeding passage 160 feeds the lubricant oil fed from the oil passage 161 to the operative clutch pawls 74b and the non-operative clutch pawls 74a of the second clutch mechanism 70 via a distributing oil passage 164 provided between and across the boss portion of the output side rotational member 73 and the rotational shaft 97, and feeds the oil through the inside of the second clutch mechanism 70 to the operative clutch pawls 64b and the non-operative clutch pawls 64a of the first clutch mechanism 60. The oil feeding passage 160 feeds the lubricant oil fed from the oil passage 161 to the outer peripheral side and the inner peripheral side of the planet gears 46, 54 of the upstream planetary mechanism 40 and the downstream planetary mechanism 50 via a distributing oil passage 165 provided between and across the carrier 44 and the rotational shaft 97.

As shown in FIG. 13, operating valves 150, 151, 152, 153, 154 of the first clutch mechanism 60, the second clutch mechanism 80, the brake mechanism 100, the operable coupling clutch mechanism 110 and the output clutch mechanism 120 are supported to an oil passage forming block 170 disposed on the outer face side of the lateral wall portion Kd of the transmission case K to be detachably attached to the transmission case K.

Figure 14:
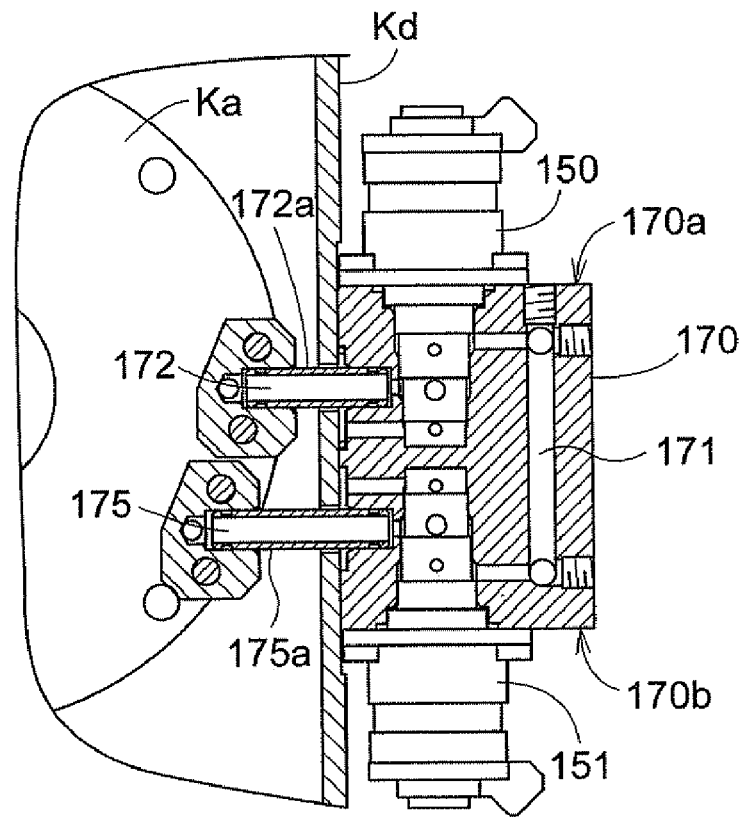
Figure 15:
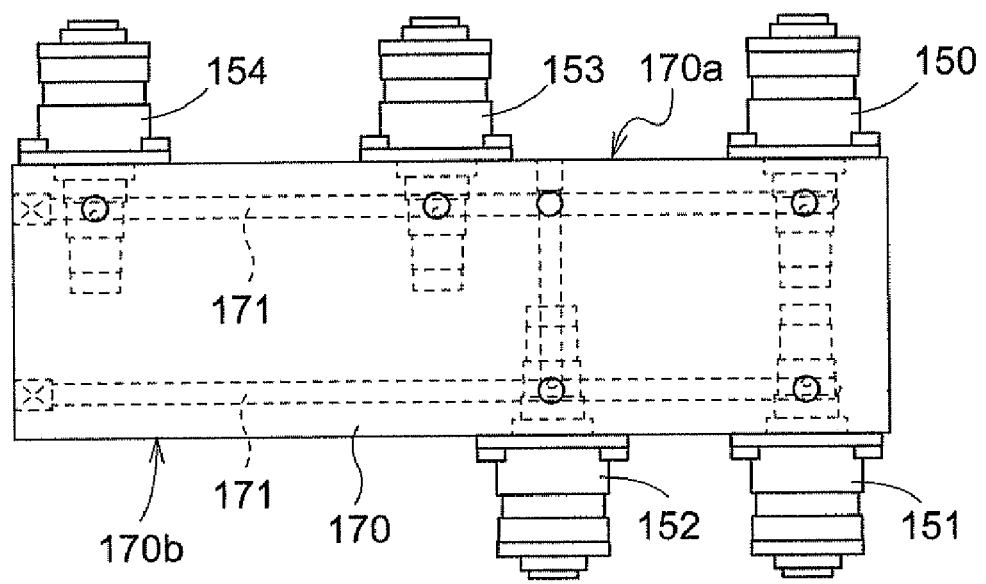

As shown in FIG. 14 and FIG. 15, the oil passage forming block 170 supports the plurality of operating valves 150-154 from the upper face 170a and the lower face 170b of this block 170 in distribution and supports them in such a manner that all of the operating valves 150-154 may be attached to and detached from the transmission case K at one time together with the oil passage forming block 170, in association with attachment/detachment of the oil passage forming block 10 to/from the transmission case K.

The oil passage forming block 170 includes an oil feeding passage 171 as being defined in this block 170 and connects the pump ports of the respective operating valves 150-154 via this oil feeding passage 171 to a hydraulic pump (not shown).

As shown in FIG. 13 and FIG. 14, the operating valve 150 of the first clutch mechanism 60 is connected to the hydraulic piston 65 of the first clutch mechanism 60 via an operating oil passage 172 formed by a pipe member 172a attached between the oil passage forming block 170 and the transmission case portion Ka provided by attaching an annular member provided inside the transmission case K with the output shaft 72 being inserted therethrough; an operating oil passage 173 extending through the transmission case portion Ka; and an operating oil passage 174 defined in an operational portion 63a formed integral with the output side rotational members 63, 73 of the first clutch mechanism 60 and the second clutch mechanism 70.

The operating valve 151 of the second clutch mechanism 70 is connected to the hydraulic piston 75 of the second clutch mechanism 70 via an operating oil passage 175 formed by a pipe member 175a attached between the transmission case portion Ka and the oil passage forming block 170; an operational oil passage 176 defined in the transmission case Ka; and an operational oil passage 177 defined in the operational portion 63a.

The operational portion 63a comes into slidable and rotatable contact with an end portion Ka1 of the transmission case portion Ka under rotating conditions of the output side rotational member 63 and the output side rotational member 73, so as to establish communications between the operational oil passage 174 and the operational oil passage 173 and between the operational oil passage 177 and the operational oil passage 176, respectively, irrespectively of the rotations of the output side rotational member 63 and the output side rotational member 73.

With the above, the operating valve 150 feeds the operational oil fed from the operational oil passage 171 to the hydraulic piston 65 via the operational oil passage 172, the operational oil passage 173 and the operational oil passage 174, or discharges the oil from the hydraulic piston 65 via the operational oil passage 172, the operational oil passage 173 and the operational oil passage 174, whereby the hydraulic piston 65 is slidably operated to switch over the first clutch mechanism 60 between the engaged state and the disengaged state.

The operating valve 151 feeds the operational oil fed from the operational oil passage 171 to the hydraulic piston 75 via the operational oil passage 175, the operational oil passage 176 and the operational oil passage 177, or discharges the oil from the hydraulic piston 75 via the operational oil passage 177, the operational oil passage 176 and the operational oil passage 175, whereby the hydraulic piston 75 is slidably operated to switch over the second clutch mechanism 70 between the engaged state and the disengaged state.

As shown in FIG. 13, the operating valve 152 of the brake mechanism 100 feeds the operational oil fed from the operational oil passage 171 to the hydraulic piston 104 via the operational oil passage 178 formed by a pipe member 178a attached between the fixed body 102 and the oil passage forming block 170 and via an operational oil passage 179 defined in the fixed body 102, or discharges the oil from the hydraulic piston 104 via the operational oil passage 179 and the operational oil passage 178, whereby the hydraulic piston 104 is slidably operated to switch over the brake mechanism 100 between the engaged state and the disengaged state.

As shown in FIG. 13, the operating valve 153 of the operable coupling clutch mechanism 110 is connected to the hydraulic piston 114 via an operational oil passage 180 formed by a pipe member 180a attached between the oil passage forming block 170, and the transmission case portion Kb provided by attaching an annular member provided inside the transmission case K with the carrier side rotational member 112 being inserted therethrough; an operational oil passage 181 defined in the transmission case portion Kb; and an operational oil passage 182 defined in the carrier side rotational member 112.

The carrier side rotational member 112, under its rotating condition, comes into slidable and rotatable contact with the transmission case portion Kb, thereby to establish communication between the operational oil passage 181 and the operational oil passage 182, irrespectively of the rotation of the carrier side rotational member 112.

With the above, the operating valve 153 fed from the feed oil passage 171 to the hydraulic piston 114 via the operational oil passage 180, the operational oil passage 181 and the operational oil passage 182 or discharges the oil from the hydraulic piston 114 via the operational oil passage 182, the operational oil passage 181 and the operational oil passage 180, whereby the hydraulic piston 114 is slidably operated to switch over the operable coupling clutch mechanism 110 between the engaged state and the disengaged state.

As shown in FIG. 13, the operating valve 154 of the output clutch mechanism 120 is connected to a hydraulic piston 124 via an operational oil passage 183 formed by a pipe member 183a attached between the oil passage forming block 170, and a transmission case portion Kc formed in the transmission case K by attaching an annular member through which the output rotational body 121 is inserted; an operational oil passage 184 defined in the transmission case portion Kc; and an operational oil passage 185 defined in the output side rotational member 121.

The output side rotational member 121, under its rotating condition, comes into slidable and rotatable contact with the transmission case portion Kc, so as to establish communication between the operational oil passage 185 and the operational oil passage 184, irrespectively of the rotation of the output side rotational member 121.

With this, the operating valve 154 feeds the operational oil fed from the oil feeding passage 171 to the hydraulic piston 124 via the operational oil passage 183, the operational oil passage 184 and the operational oil passage 185 or discharges the oil from the hydraulic piston 124 via the operational oil passage 185, the operational oil passage 184 and the operational oil passage 183, whereby the hydraulic piston 124 is slidably operated to switch over the output clutch mechanism 120 between the engaged state and the disengaged state.

Figure 11:
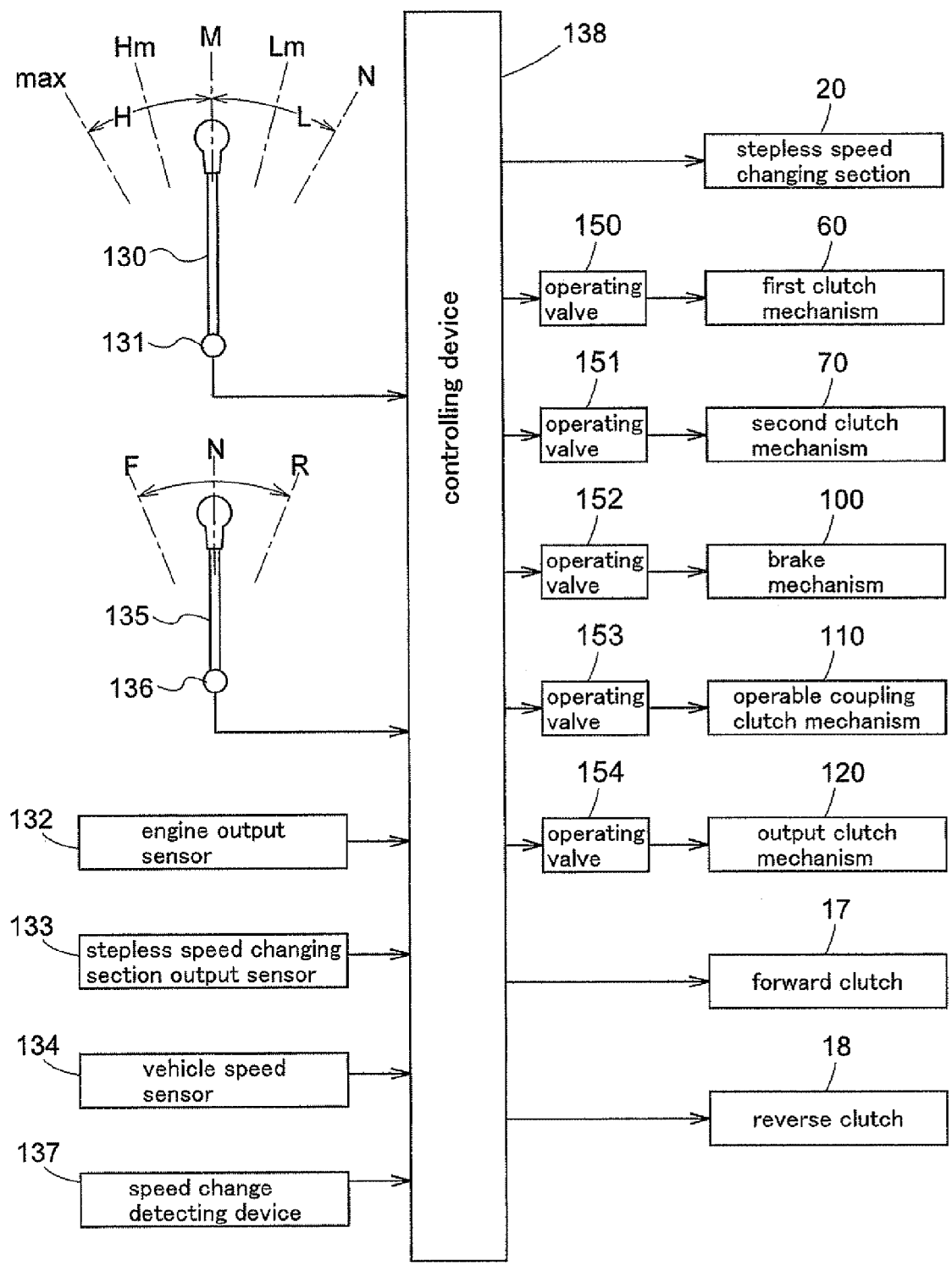

As shown in FIG. 11, the controlling device 138 is operably coupled with an operating portion (not shown) of an actuator (not shown) for varying a swash angle of the hydraulic pump 23 of the stepless speed changing section 20. The controlling device 138 is operably coupled with the operating valves 150, 151, 152, 153, 154 of the first clutch mechanism 60, the second clutch mechanism 70, the brake mechanism 100, the operable coupling clutch mechanism 110 and the output clutch mechanism 120. The controlling device 138 is operably coupled with an actuator (not shown) for switching over the forward clutch 17 and the reverse clutch 18.

Figure 16:
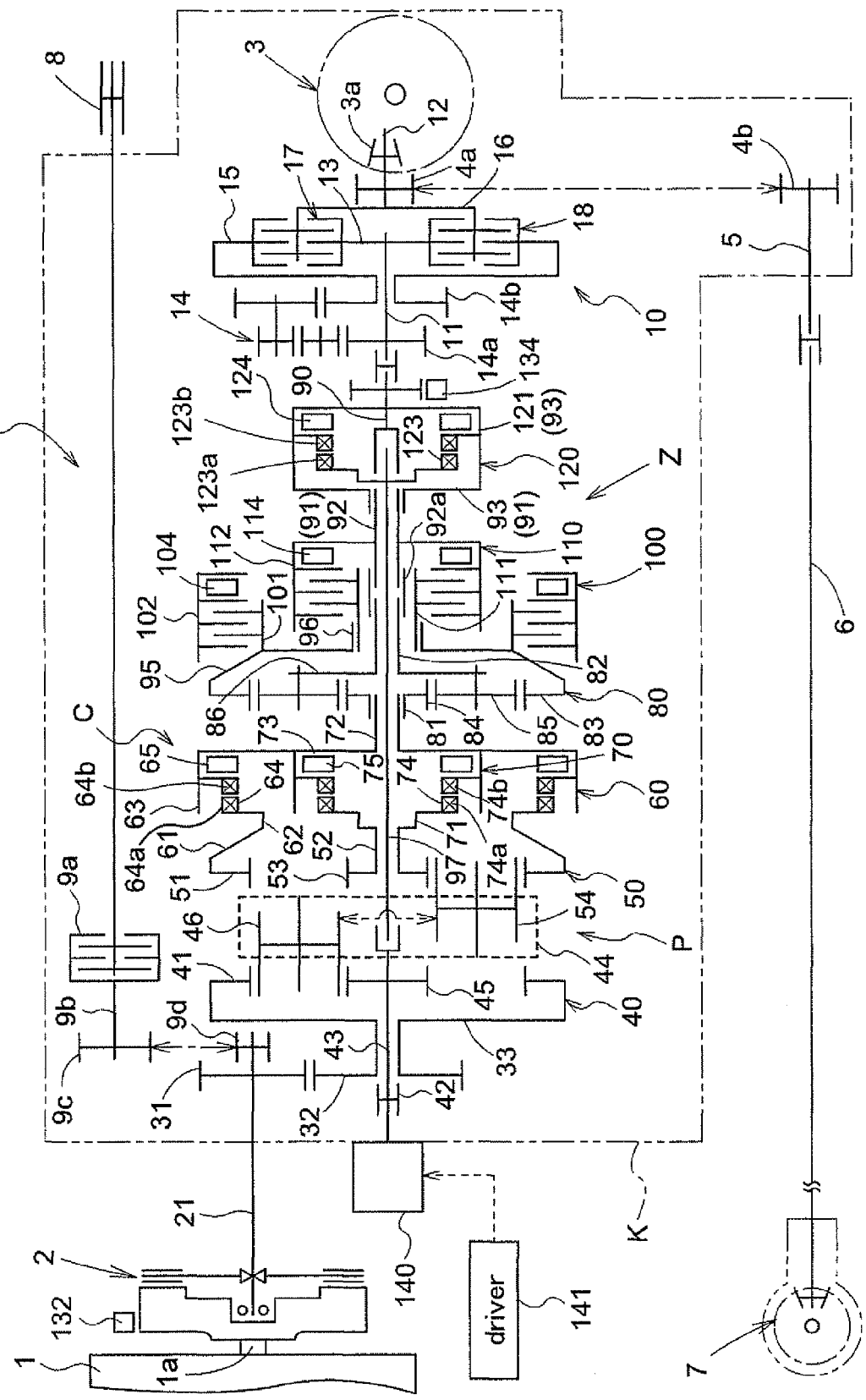
Figure 17:
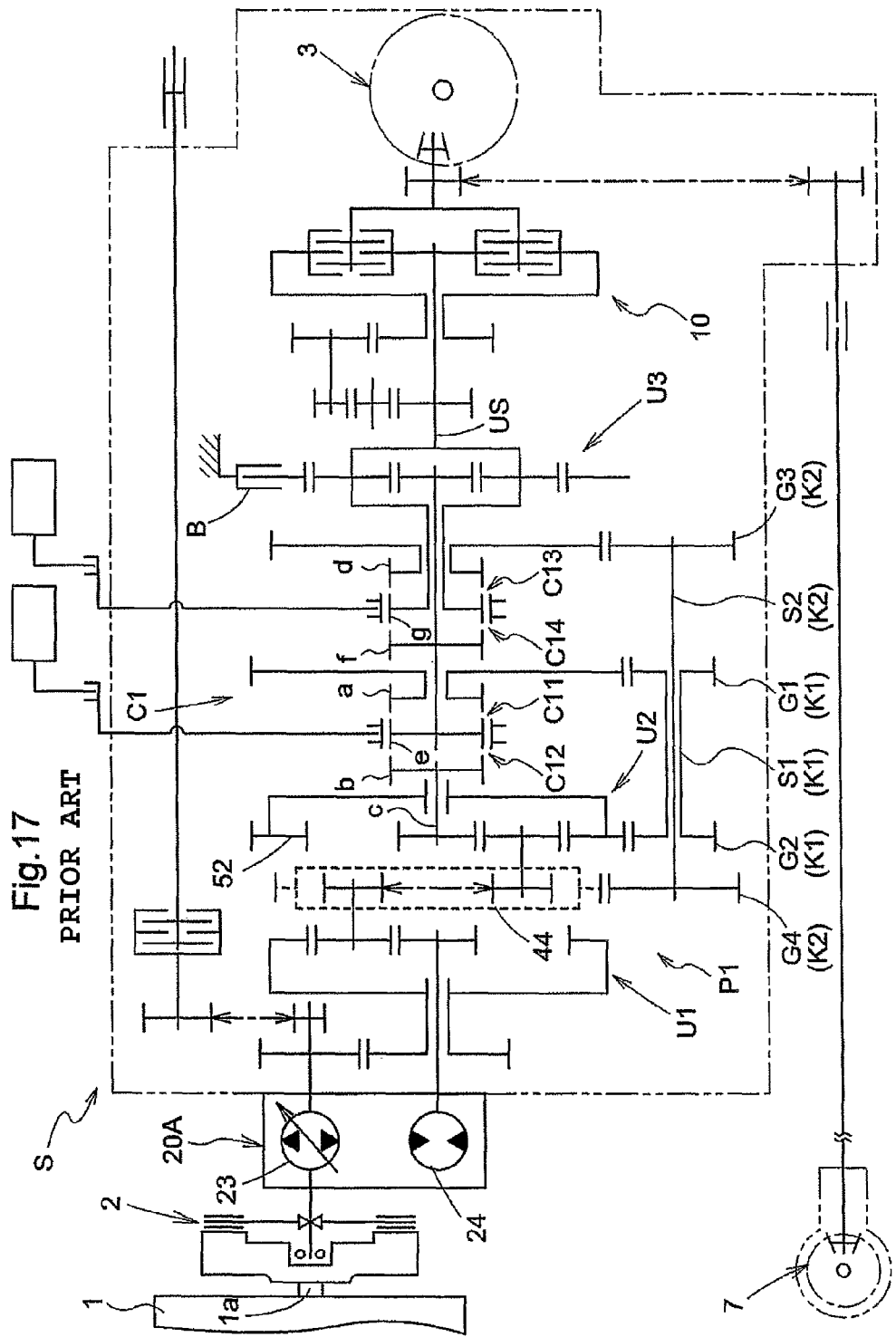
Figures 18, 19:
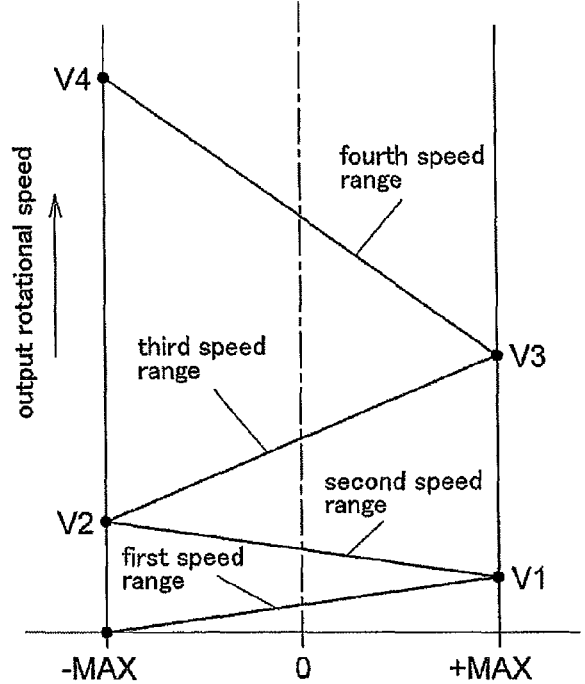

In the embodiment shown in FIG. 16, like the second embodiment shown in FIG. 8, the speed changing transmission apparatus A includes an electric motor 140. The detailed construction thereof is as is described hereinbefore in the second embodiment.

Other Embodiments

Instead of the first clutch mechanism 60, the second clutch mechanism 70 and the output clutch mechanism 120, it is possible to embody the invention by adopting a first clutch mechanism, a second clutch mechanism and an output clutch mechanism wherein the operative clutch pawls are provided in the input side rotational members 62, 71, 122 and the non-operative clutch pawls are provided in the output rotational members 63, 72, 121. In this case too, the object of the present invention can be achieved. And, in this case, the hydraulic piston will be slidably provided to each input side rotational member.

Instead of the operable coupling clutch mechanism 110 described above, it is also possible to embody the invention by adopting an operable coupling clutch mechanism wherein the hydraulic piston is slidably provided to the ring side rotational member. In this case too, the object of the present invention can be achieved.

INDUSTRIAL APPLICABILITY

The speed changing transmission apparatuses of the embodiments of the present invention can be used as a speed changing apparatus for a work vehicle such as a tractor.

The invention claimed is:

1. A speed changing transmission apparatus having an input shaft for inputting drive force from an engine and an output rotational body, wherein the drive force is provided in a plurality of stages of speeds, and in the range of each speed stage, the drive force steplessly speed changed being outputted from the output rotational shaft, said apparatus comprising:
  a stepless speed changing section inputting a drive force from an electric motor or an engine;
  a composite planetary transmission section having a downstream planetary transmission mechanism, the transmission section synthesizing output from said stepless speed changing section with an engine drive force not subjected to any speed changing action by said stepless speed changing section or synthesizing output from said electric motor with the drive force of the engine;

a clutch section including a first clutch mechanism having an input side rotational member operably coupled to a ring gear included in said downstream planetary transmission mechanism and a second clutch mechanism having an input side rotational member operably coupled to a sun gear included in said downstream planetary transmission mechanism;

a speed-reducing planetary transmission mechanism having a sun gear operably coupled to an output side rotational member of each one of said first clutch mechanism and said second clutch mechanism and having also a carrier operably coupled to said output side rotational member;

a brake mechanism switchable between an engaged state for applying a braking action to the ring gear of said speed-reducing planetary transmission mechanism and a disengaged state for releasing the braking action to said ring gear;

an operable coupling clutch mechanism switchable between an engaged stage for operably coupling said ring gear and said carrier of said speed-reducing planetary transmission mechanism for rotating these together in unison and a disengaged state for disengaging the operable coupling between said ring gear and said carrier; and an output clutch mechanism for engaging/disengaging a drive force from said carrier of said planetary transmission section to said output rotational body;

wherein said sun gear of the planetary transmission section, said input side rotational member of the first clutch mechanism, said input side rotational member of the second clutch mechanism, said sun gear of the speed-reducing planetary transmission mechanism, and an input side rotational member of the output clutch mechanism are arranged to be rotatable about a common rotational axis; and wherein a rotational shaft for operably coupling said carrier of the planetary transmission section to said output rotational body is arranged to be inserted through said downstream planetary transmission mechanism, said first clutch mechanism, said second clutch mechanism, and said speed-reducing planetary transmission mechanism.

2. The speed changing transmission apparatus according to claim 1, wherein said speed changing transmission apparatus includes a first speed range, a second speed range, a third speed range and a fourth speed range; and when said output rotational body is driven in said third speed range, said operable coupling clutch mechanism is operated into the engaged state.

3. The speed changing transmission apparatus according to claim 1, wherein said first clutch mechanism, said second clutch mechanism and said output clutch mechanism comprise meshing clutches.

4. The speed changing transmission apparatus according to claim 3, wherein the first clutch mechanism, the second clutch mechanism and the output clutch mechanism each includes a non-operative clutch pawl provided on one of the input side rotational member and the output side rotational member to be rotatable in unison therewith; and an operative clutch pawl provided on the other of the input side rotational member and the output side rotational member to be slidable thereon, and wherein said operative clutch pawl is slidable into an engaged state engaged with said non-operative clutch pawl to be rotatable in unison therewith or a disengaged state detached from said non-operative clutch pawl.

5. The speed changing transmission apparatus according to claim 1 or 2, wherein a support shaft which supports at least said downstream planetary transmission mechanism and said speed-reducing planetary transmission mechanism defines an oil feeding passage for feeding lubricant oil to said downstream planetary transmission mechanism and said speed-reducing planetary transmission mechanism;

a hydraulic piston for switching over the clutch mechanism is provided in an input side rotational member or an output side rotational member of each one of said first and second clutch mechanisms; and in correspondence with each one of said first and second clutch mechanisms, there are provided a transmission case portion provided in said transmission case for slidably and rotatably contacting either one of said input side rotational member and said output side rotational member including said hydraulic piston, and an operational oil passage provided in said transmission case portion for feeding/discharging operational oil relative to said hydraulic piston.

6. The speed changing transmission apparatus according to claim 5, wherein an operational valve of each one of said first and second clutch mechanisms is supported to one oil passage forming block.

7. The speed changing transmission apparatus according to claim 6, wherein said oil passage forming block is disposed on the outer face side of said transmission case.

* * * * *